(12) United States Patent
Sogame

(10) Patent No.: US 7,247,088 B2
(45) Date of Patent: Jul. 24, 2007

(54) AIR CONDITIONER FOR VEHICLE

(75) Inventor: Katsumasa Sogame, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/934,528

(22) Filed: Sep. 7, 2004

(65) Prior Publication Data

US 2005/0067140 A1    Mar. 31, 2005

(30) Foreign Application Priority Data

Sep. 25, 2003 (JP) ............................. 2003-333118
Sep. 25, 2003 (JP) ............................. 2003-333119
Sep. 25, 2003 (JP) ............................. 2003-333120

(51) Int. Cl.
*B60H 1/24* (2006.01)

(52) U.S. Cl. ..................................... 454/124

(58) Field of Classification Search ............... 454/124, 454/152, 155; 165/42, 69; 62/244
See application file for complete search history.

(56) References Cited

U.S. PATENT DOCUMENTS

| | | | | |
|---|---|---|---|---|
| 2,746,100 A | * | 5/1956 | Nallinger | ..................... 454/123 |
| 4,709,957 A | * | 12/1987 | Ohya | ....................... 296/146.9 |
| 5,137,326 A | * | 8/1992 | George | ........................ 296/208 |
| 5,733,190 A | * | 3/1998 | Wahab | ........................ 454/164 |
| 5,950,722 A | | 9/1999 | Huetteman | |
| 6,179,707 B1 | * | 1/2001 | Arold | ........................... 454/152 |
| 2002/0178744 A1 | * | 12/2002 | Tanabe et al. | ................. 62/407 |
| 2003/0054750 A1 | | 3/2003 | Luik et al. | |
| 2004/0259492 A1 | * | 12/2004 | Suzuki et al. | ................ 454/124 |
| 2005/0090194 A1 | * | 4/2005 | Derleth et al. | ............... 454/152 |

FOREIGN PATENT DOCUMENTS

| | | |
|---|---|---|
| DE | 2 318 097 | 10/1974 |
| DE | 100 07 402 A 1 | 8/2001 |
| FR | 2 473 962 | 7/1981 |
| JP | 07-266841 | 10/1995 |
| JP | 2002-012020 | 1/2002 |
| WO | WO 95/17314 | 6/1995 |

* cited by examiner

*Primary Examiner*—Gregory Wilson
(74) *Attorney, Agent, or Firm*—Nixon Peabody LLP; Donald R Soudehaker

(57) ABSTRACT

In an air conditioner for a vehicle including a front pillar which is disposed diagonally in front of a passenger and extends slant in a longitudinal direction of the vehicle, there are provided an air conditioning duct disposed along the front pillar, a front-pillar conditioned-air blowoff port which blows off conditioned air toward the passenger from the air conditioning duct, and a louver device to be disposed at the front pillar and deflect the conditioned air within an angle which is smaller than a slant angle of the front pillar, whereby the conditioned air from the louver device can be blown off toward a neck portion and a head portion of the passenger. Thus, efficient air conditioning to a neck portion and its surroundings, which are sensitive to the passenger's air conditioning feeling, can be provided.

16 Claims, 32 Drawing Sheets

|  | Door 74 | Door 78 |
|---|---|---|
| F P | Close | Open |
| B O T H | Open | Open |
| S I D E | Open | Close |

FIG. 24

AIR CONDITIONER FOR VEHICLE

BACKGROUND OF THE INVENTION

The present invention relates to an air conditioner for a vehicle including a front pillar which is disposed diagonally in front of a passenger and extends slant in a longitudinal direction of the vehicle.

Conventionally, the following structures as an air conditioner for a vehicle, particularly for a so-called open car, are known.

Namely, there are provided blowoff ports to blow off conditioned air toward foot portions of passengers at both side faces of a center console disposed between a driver's seat and a passenger's seat, and when a roof detecting sensor detects opening of a roof, an air conditioning mode is changed to a roof open mode so as to blow off the conditioned air toward the foot portions of the passengers from the blowoff ports, whereby a comfortable air-conditioning feeling can be obtained by avoiding an uncomfortable cool-feeling due to an outside air flowing into a passenger compartment of the vehicle when the roof of the open car opens (see, for example, Japanese Patent Laid-Open Publication No. 2002-12020).

Further, there is provided state detecting means for detecting an opening/closing state of a convertible top, and when the state detecting means detects opening of the convertible top, air is allowed to be blown off from a blowoff port provided at a front header so as to prevent the outside air from flowing into the passenger compartment of the vehicle from the opened top during a vehicle running, whereby the function of air conditioning can be attained properly (see, for example, Japanese Patent Laid-Open Publication No. 7-266841).

However, the above-described conventional structures still had a problem that efficient air conditioning could not be provided for a neck portion and its surroundings of the passenger which are sensitive to the passenger's air conditioning feeling.

Generally, it is known that the passenger can feel the air-conditioning feeling sufficiently by receiving the conditioned air at the passenger's thigh portion, lower portion of an armpit or neck portion. This can be applied to not only the open car but also a normal car with a closed roof, and it was still a problem to be solved how the proper air-conditioning effect could be obtained, particularly, for the neck portion and its surroundings of the passenger.

SUMMARY OF THE INVENTION

The present invention has been devised in view of the above-described problems, and an object of the present invention is to provide an air conditioner for a vehicle which can provide efficiently air conditioning to the neck portion and its surroundings which are sensitive to the passenger's air conditioning feeling, improve the air conditioning function, and make the passenger feel the air conditioning effect efficiently.

This object is solved by an air conditioner for a vehicle according to a present invention of claim 1. Preferred embodiments of the present invention are subject of the dependent claims.

According to the present invention of claim 1, there is provided an air conditioner for a vehicle including a front pillar which is disposed diagonally in front of a passenger and extends slant in a longitudinal direction of the vehicle, comprising an air conditioning duct to be disposed along the front pillar, a front-pillar conditioned-air blowoff port which blows off conditioned air toward the passenger from the air conditioning duct, and a louver device to be disposed at the front pillar and deflect the conditioned air within an angle which is smaller than a slant angle of the front pillar, whereby the conditioned air from the louver device can be blown off toward a neck portion and a head portion of the passenger.

The above-described slant angle of the front pillar is equivalent to an attack angle of the front pillar given that a beltline of the vehicle is placed horizontally.

According to the air conditioner of the present invention, since the conditioned air blown off from the front-pillar conditioned-air blowoff port is deflected toward the passenger's neck and head portions by the louver device, it can provide efficiently air conditioning to the neck portion and its surroundings which are sensitive to the passenger's air conditioning feeling, improve the air conditioning function, and make the passenger feel the air conditioning effect efficiently.

According to a preferred embodiment of the present invention, the louver device is configured so as to be adjustable within a specified angle in a vertical direction of the vehicle, whereby the conditioned air from the louver device can be blown off toward the neck portion and the head portion of the passenger.

Accordingly, since the blowoff direction of the conditioned air is adjustable in the vertical direction of the vehicle by the louver device, it can be adjusted properly according to a body size of the passenger.

According to another preferred embodiment of the present invention, the louver device is configured so as to be adjustable within a specified angle in a width direction of the vehicle, whereby the conditioned air from the louver device can be blown off toward the neck portion and the head portion of the passenger.

Accordingly, since the blowoff direction of the conditioned air is adjustable in the width direction of the vehicle by the louver device, it can be adjusted properly according to the body size of the passenger.

According to another preferred embodiment of the present invention, a sitting position of the passenger is configured so as to be adjustable in the longitudinal direction of the vehicle, and the louver device is configured so as to be adjustable such that the conditioned air from the louver device can be blown off toward the neck portion and the head portion of the passenger regardless of the sitting position of the passenger.

Accordingly, the conditioned-air blowoff can be adjusted to proper positions by the louver device according to the passenger's body size even if the passenger's sitting position is changed in the longitudinal direction.

According to another preferred embodiment of the present invention, the louver device is located at a relatively upper portion of the front pillar from the middle.

Accordingly, since the distance between the louver device and the passenger becomes short, more effective air conditioning can be obtained and thereby even limited amount of conditioned air can be blown off toward the passenger certainly.

According to another preferred embodiment of the present invention, the louver device is configured so as to blow off concentrated conditioned air toward the neck portion and the head portion of the passenger.

Accordingly, since the concentrated conditioned air is directed to desired portions, the passenger can feel the air conditioning effect more certainly.

According to another preferred embodiment of the present invention, at least a roof portion of the vehicle, which is located from above the passenger to the front pillar, is configured so as to open.

Accordingly, an efficient air-conditioning control can be provided particularly for the open car which may have a difficulty in maintaining the proper temperature in the passenger compartment due to the outside air coming in.

According to another preferred embodiment of the present invention, the air conditioner further comprises a vent blowoff port to blow off the conditioned air toward the passenger from an instrument panel disposed at a vehicle front, and a blowoff-air adjusting device operative to adjust a blowoff amount of the conditioned air from the vent blowoff port and the front-pillar conditioned-air blowoff port.

The above-described vent blowoff port may be located at a side vent blowoff port, and the blowoff-air adjusting device may be configured of a manually-operated type of device or an electrically-driven type of device.

Accordingly, since the conditioned air is blown off toward the passenger's neck and head portions from the front-pillar conditioned-air blowoff port, the air conditioner can provide efficiently air conditioning to the neck portion and its surroundings which are sensitive to the passenger's air conditioning feeling and improve the air conditioning function.

Further, since the blowoff-air adjusting device adjusts the blowoff amount of the conditioned air from the vent blowoff port and the front-pillar conditioned-air blowoff port, specifically the ratio of the blowoff amount of the conditioned air from between them, a proper conditioned-air amount adjustment can be attained according to needs of the passenger.

According to another preferred embodiment of the present invention, at least a roof portion of the vehicle, which is located from above the passenger to the front pillar, is configured so as to open, and the blowoff-air adjusting device is configured so as to increase the amount of the conditioned air from the front-pillar conditioned-air blowoff port more than that from the vent blowoff port when the roof portion opens, compared with when the roof portion is closed.

Accordingly, since the amount of conditioned air from the front-pillar conditioned-air blowoff port is increased (including no-blowoff from the vent blowoff port) when the roof portion opens, the passenger can feel the air conditioning effect more properly even if the outside air comes in the passenger compartment during the roof open driving.

According to another preferred embodiment of the present invention, the blowoff-air adjusting device is driven by a drive device.

The above-described drive device may be configured of a reversible motor, a rotary actuator or the like.

Accordingly, the blowoff-air adjusting device, which is operative to increase the amount of conditioned air from the front-pillar conditioned-air blowoff port more than that from the vent blowoff port when the roof portion opens, can be driven automatically.

According to another preferred embodiment of the present invention, the instrument panel is equipped with an air conditioning unit, the air conditioning unit and the vent blowoff port are connected by a vent duct, and there is provided a front-pillar air-conditioning duct which diverges from the vent duct and is disposed along the front pillar to be connected to the front-pillar conditioned-air blowoff port.

Accordingly, since the front-pillar air-conditioning duct is configured so as to diverge from the vent duct, a simple duct structure can be provided and thereby a duct layout in the instrument panel can be improved.

According to another preferred embodiment of the present invention, the instrument panel is equipped with an air conditioning unit, the air conditioning unit and the vent blowoff port are connected by a vent duct, and there is provided a front-pillar air-conditioning duct which extends along the front pillar in parallel to the vent duct to be connected to the front-pillar conditioned-air blowoff port.

Accordingly, no structure for switching the conditioned air at an end side of the vent duct is necessary, and upstream portions (base portions) of the vent duct and the front-pillar air-conditioning duct can be placed intensively at a side of the air conditioning unit, thereby facilitating switching of conditioned air.

According to another preferred embodiment of the present invention, at least a roof portion of the vehicle, which is located from above the passenger to the front pillar, is configured so as to open, and there is provided a blowoff-air adjusting device operative to adjust a blowoff amount of the conditioned air from the front-pillar conditioned-air blowoff port according to an opening of the roof portion.

Accordingly, since the blowoff-air adjusting device adjusts the blowoff amount of conditioned air from the front-pillar conditioned-air blowoff port according to the opening of the roof portion, the air conditioner can provide efficiently air conditioning to the neck portion and its surroundings which are sensitive to the passenger's air conditioning feeling in the open car and improve the air conditioning function.

According to another preferred embodiment of the present invention, there is provided an impact absorbing portion to absorb an impact acting from an inside of a passenger compartment at the air conditioning duct, and the impact absorbing portion is configured so as to absorb the impact by being deformed by the impact which is greater than a specified value.

Accordingly, since the impact absorbing portion to absorb the impact acting from the inside of the passenger compartment at the air conditioning duct is provided, when the passenger's head hits the air conditioning duct during a vehicle collision, the impact absorbing portion is deformed, absorbing the impact. As a result, the security of the passenger's head during the vehicle collision can be maintained.

According to another preferred embodiment of the present invention, the air conditioning duct includes a cylinder portion for letting the conditioned air flow therein, the cylinder portion includes a rib portion provided therein along a flow direction of the conditioned air, and the rib portion is configured so as to be destroyed (deformed) by the impact greater than the specified value.

Accordingly, since the rib portion for impact absorption is provided along the flow direction of the conditioned air, the conditioned air flowing is not prevented by the rib portion. As a result, both the conditioned air flowing and the impact absorption can be attained properly.

According to another preferred embodiment of the present invention, the rib portion comprises plural ribs, and the plural ribs are configured so as to be destroyed (deformed) respectively by the impact greater than the specified value.

Accordingly, even if the passenger's head hits the air conditioning duct at the side of front pillar from different directions during the vehicle collision, the plural ribs can cope with this. As a result, the security of the passenger's head can be improved and the strength of the air conditioning duct during a vehicle non-collision can be maintained by these plural ribs.

According to another preferred embodiment of the present invention, the air conditioning duct comprises a base portion which is attached to the front pillar and a duct portion which is attached to the base portion and exposed to the inside of the passenger compartment, and a rib portion is interposed between the base portion and the duct portion.

Accordingly, since the air conditioning duct is comprised of the base portion and the duct portion, a simple structure of the duct can be obtained and the security of the passenger's head can be maintained by the rib portion during the vehicle collision.

According to another preferred embodiment of the present invention, the duct portion comprises a front pillar trim.

Accordingly, since the front pillar trim also functions as the duct portion of the air conditioning duct, both reduction of parts number and simplification of structure can be attained.

According to another preferred embodiment of the present invention, the louver device is configured so as to be detached from the air conditioning duct by the impact greater than the specified value.

Accordingly, since the louver device is detached from the air conditioning duct by the impact greater than the specified value when the passenger's head hits the air conditioning duct during the vehicle collision, both the deflection of the conditioned air and the security of the passenger's head during the vehicle collision can be attained.

Other features, aspects, and advantages of the present invention will become apparent from the following description of the invention which refers to the accompanying drawings.

BRIEF DESCRIPTION OF THE DRAWINGS

FIG. 24 is an explanatory view showing a pattern of conditioned-air blowoff state by the operational lever.

DETAILED DESCRIPTION OF THE INVENTION

Preferred embodiments of the present invention will be described referring to the accompanying drawings. It should be understood that even though embodiments are separately described, single features thereof may be combined to additional embodiments.

The drawings show an air conditioner for a vehicle. Firstly a vehicle structure will be described referring to FIGS. 1 through 4.

Figure 1:
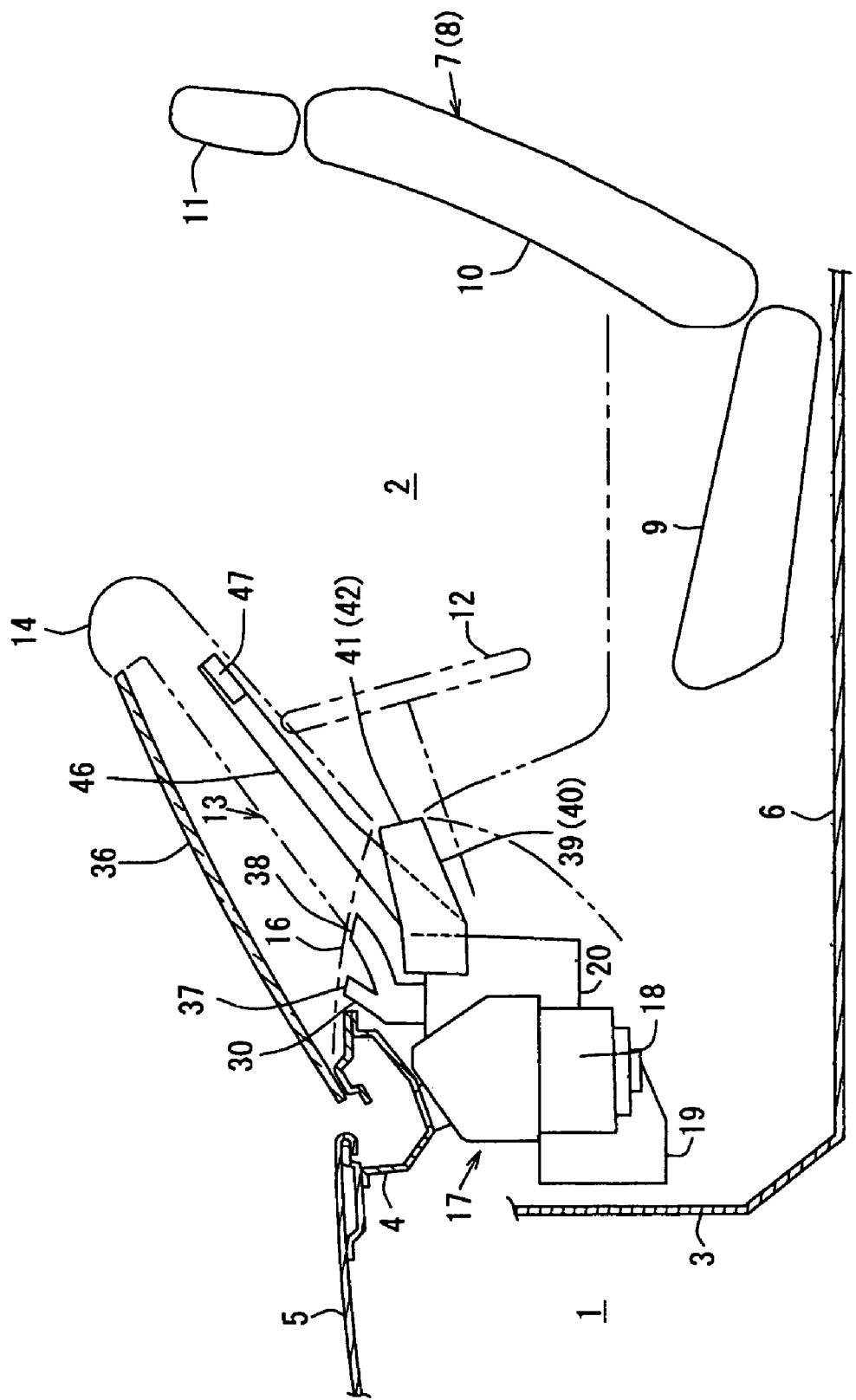
FIG. 1 is a side view of a major part of a vehicle equipped with an air conditioner for a vehicle according to the present invention.

As shown in FIG. 1, there is provided a dash lower panel 3 (dash panel) which divides an engine room from a passenger compartment in a longitudinal direction. A cowl portion 4 extending in a vehicle width direction is attached to an upper portion of the dash lower panel 3, while an upper of the engine room 1 is closed by a hood 5 adaptive to open.

Figure 2:
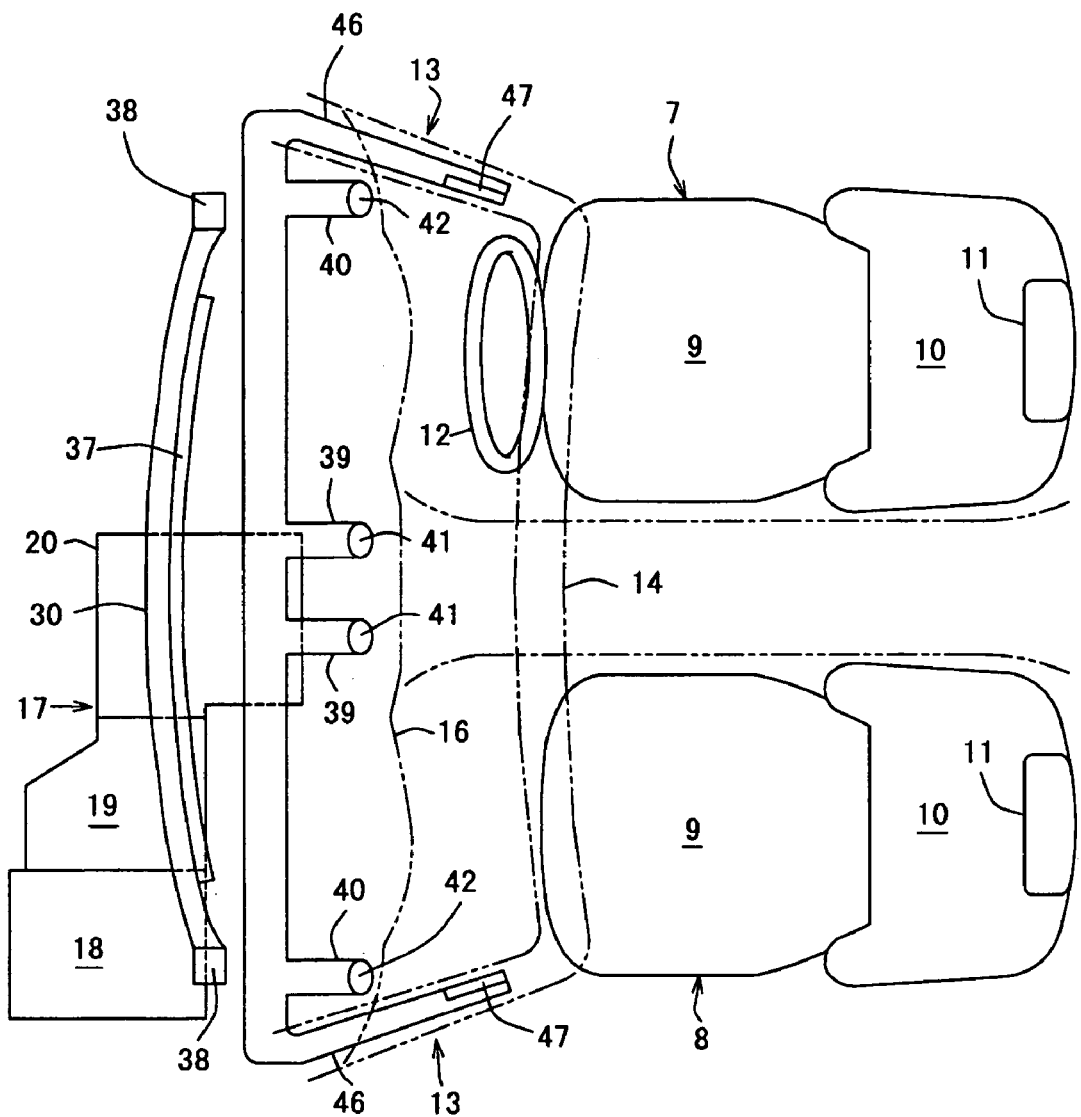
FIG. 2 is a plan view of FIG. 1.

Further, there is provided a floor panel 6 which extends rearward and horizontally or in a substantially horizontal direction, from a lower end portion of the dash lower panel 3, and a driver's seat 7 and a passenger's seat (assistant's seat) 8 are provided right and left on the floor panel 6 as shown in FIG. 2. These seats 7 and 8 are configured so as to be movable adjustably in the longitudinal direction of the vehicle by seat slide devices (not illustrated) including a pair of lower rails and upper rails, respectively. Each sitting position of passengers X, Y, and Z (see FIGS. 12 and 13) sitting on the seats 7 and 8 are adjustable in the longitudinal direction of the vehicle. These seats 7 and 8 are equipped with respective seat cushions 9, seat backs 10 and headrests 11, respectively. In front of the driver's seat 7 is provided a steering wheel 12. The present embodiment shows a vehicle with a right-side wheel, but, of course, a vehicle with a left-side wheel may be applied.

Further, there are provided a pair of right-and-left front pillars 13, 13 which are disposed diagonally in front of the passengers on the seats 7 and 8 and extend slant in the longitudinal direction of the vehicle (such that their fronts are located lower and their rears are located upper). Upper ends of the right-and-left front pillars 13, 13 are interconnected by a front header 14 which extends in a vehicle width direction and has a structure of a closed section.

Figure 4:
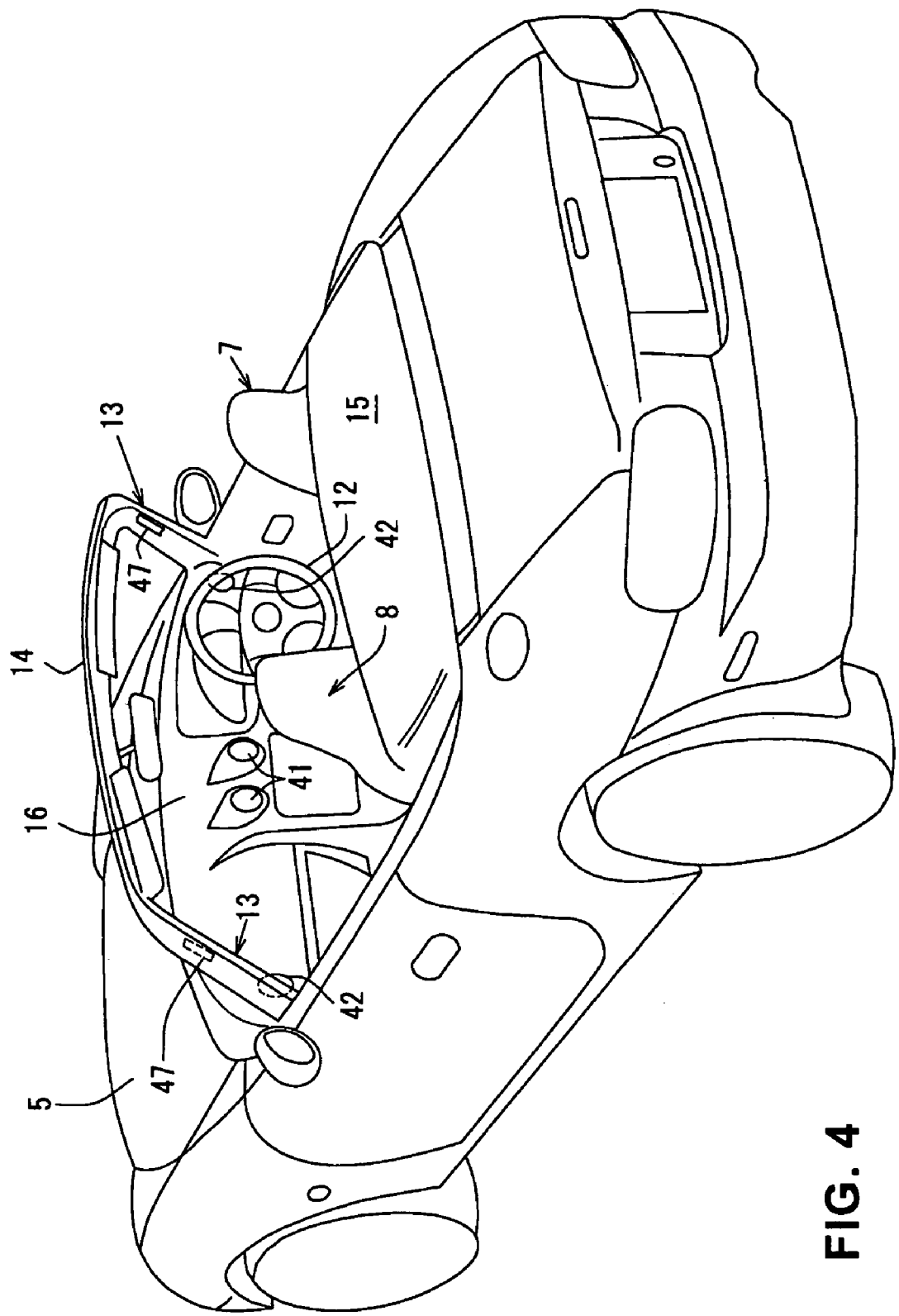
FIG. 4 is a perspective view of a vehicle including a roof portion operative to open.

Also, as shown in FIG. 4, the vehicle is a so-called open car, in which at least a roof portion 15 of the vehicle which is located from above the passengers to the front pillars 13, 13 is configured so as to open.

Next, a detailed structure of the air conditioner for a vehicle will be described.

Figure 5:
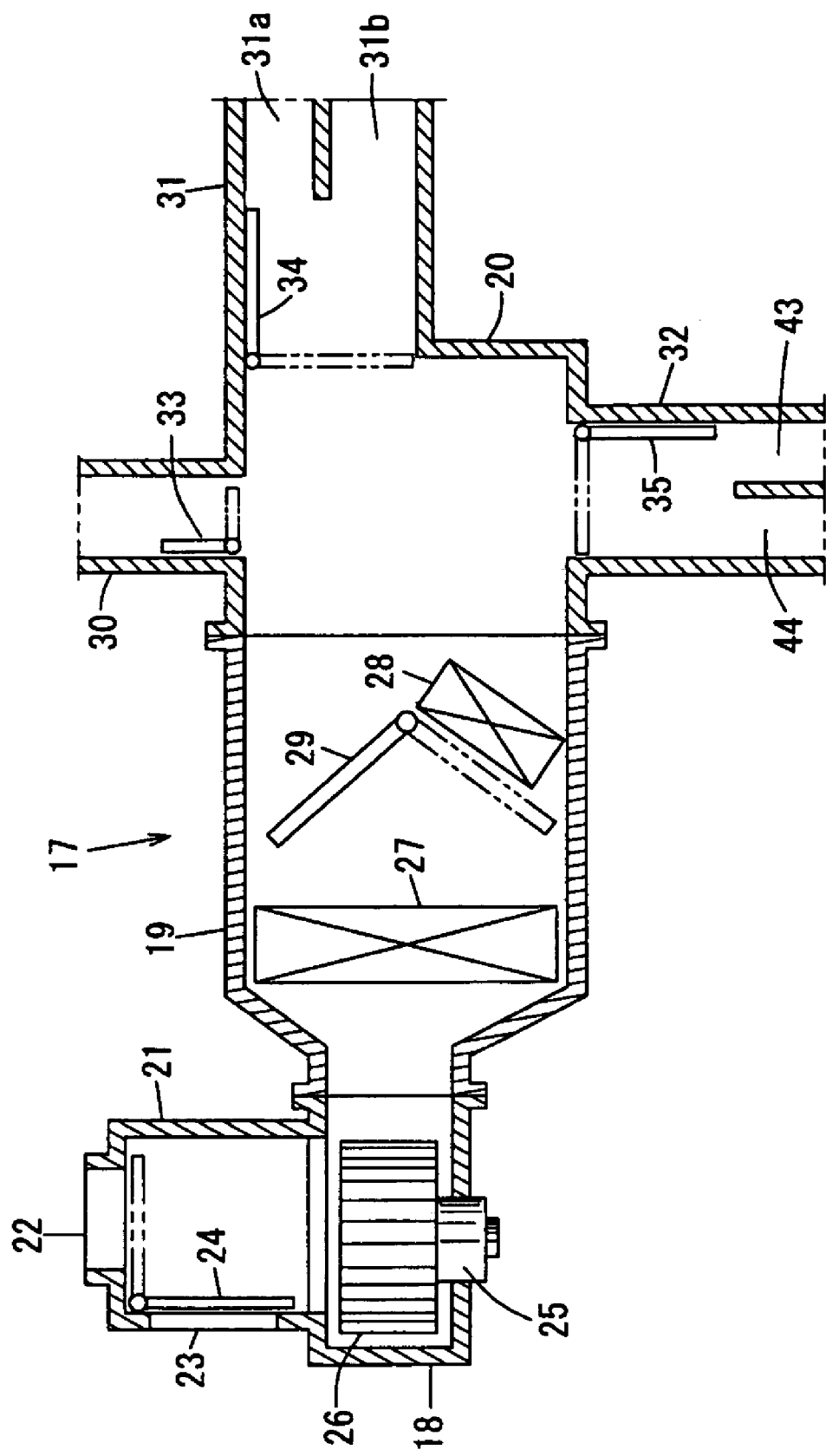
FIG. 5 is a sectional view showing an internal structure of an air conditioning unit of the air conditioner of FIG. 3.

As shown in FIGS. 1 through 4, an air conditioning unit 17 is interposed between the dash lower panel 3 and an instrument panel 16. The air conditioning unit 17 comprises a blower unit 17, a heater and cooler unit 19 as a temperature adjusting portion and a mode switching box 20. The mode switching box 20 is disposed at approximately center in the vehicle width direction in the present invention. Also, as shown in FIG. 5 of a sectional structure of the air conditioning unit 17, the blower unit 18 includes an inside-and-outside air switching box 21, which has an inside-air intake port 22 and an outside-air intake port 23 that are switched by an inside-and-outside switching door 24. A blower motor 25 is provided to drive a blower 26 to send inside air and outside air to the heater and cooler unit 19. The heater and cooler unit 19 comprises a cooler 27 (evaporator), a heater core 28 and an air mix door 29 to send conditioned cool or warm air to the mode switching box 20.

A defrost duct 30, a vent duct 31 including a passenger's seat side passage 31a and a passenger's seat side passage 31b, and a heat duct 32 are connected with the mode switching box 20, and at respective connecting portions are provided a defroster door 33, a vent door 34 and a heat door 35. The defroster duct 30 connects with a center defroster blowoff port 37 (see FIG. 2) which faces a slant lower end portion of a windshield 36 (see FIG. 1) and side defroster blowoff ports 38, 38 which are located at both sides in the vehicle width direction.

Also, the vent duct 31 includes a center vent duct 39 and a side vent duct 40 for both the driver's seat and the passenger's seat as shown in FIG. 2, and there are respectively provided a center vent blowoff port 41 (center vent blowoff portion) and a side vent blowoff port 42 (side vent blowoff port portion) at respective end portions of the center vent duct 39 and the side vent duct 40. There may be respectively provided louver devices at respective blowoff ports 41, 42 to adjust a blowoff direction of the conditioned air.

Further, the heat duct 32 includes a driver's seat side passage 43 to blow off the conditioned air toward a foot portion of the passenger on the driver's seat and a passenger's seat side passage 44 to blow off the conditioned air toward a foot portion of the passenger on the passenger's seat.

Figure 6:
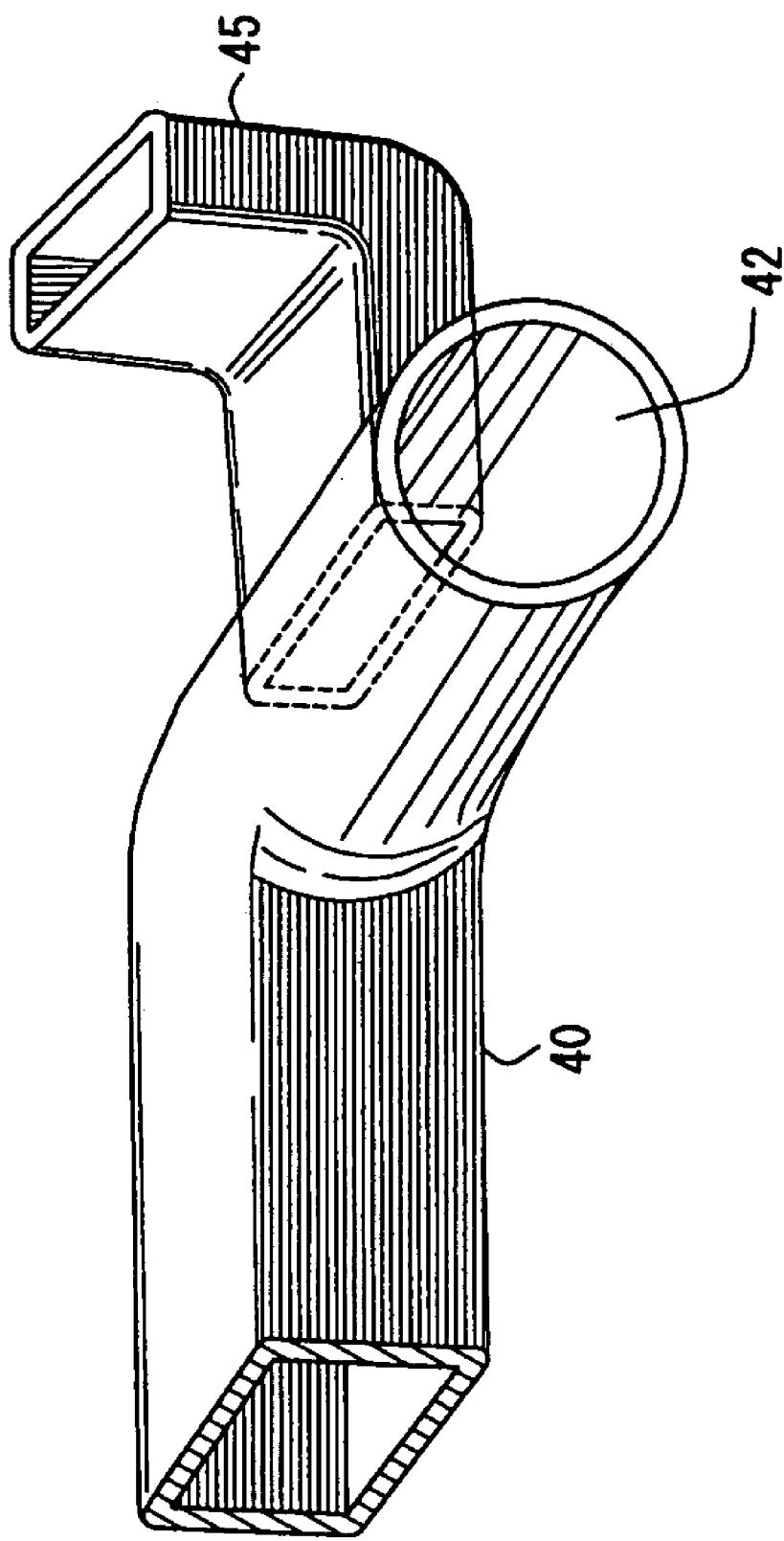
FIG. 6 is a partially enlarged perspective view of FIG. 3.

As shown in FIG. 6, an end portion of the side vent duct 40 is bent so as to be directed to the longitudinal direction, and a substantially L-shaped branch duct 45 which diverges from its middle portion in the longitudinal direction is disposed below the front pillar 13.

Figure 3:
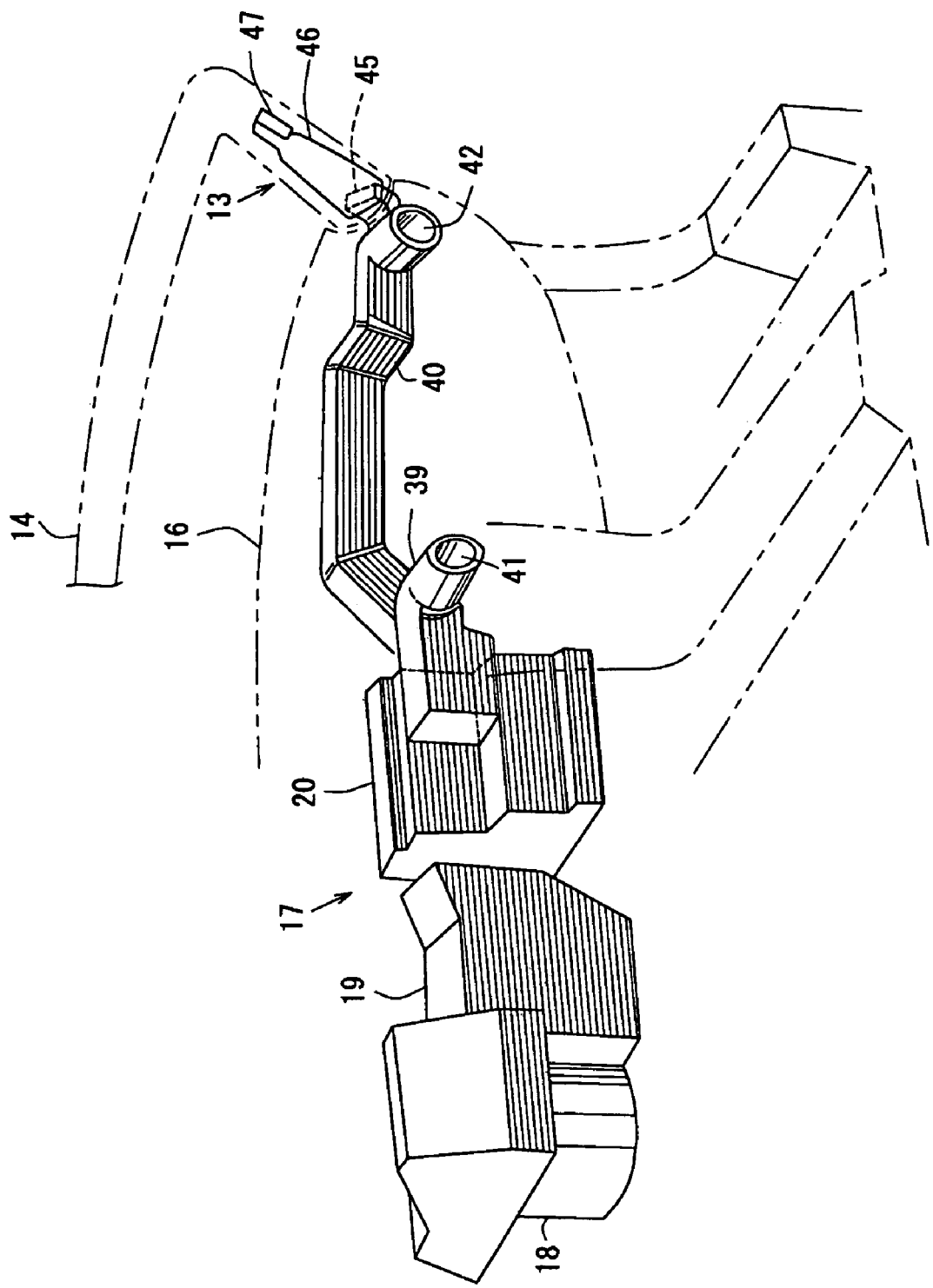
FIG. 3 is a perspective view of the air conditioner for a vehicle.

As shown in FIG. 3, at and along the above-described front pillar 13 is provided a front pillar duct 46 as an air conditioning duct, and there is provided a front-pillar conditioned-air blowoff port 47 (front-pillar conditioned-air blowoff portion) to blow off the conditioned air toward the passenger so as to expose the neck and head portions of the passenger to the blown off conditioned air directly. A lower end of the front pillar duct 46 connects with the branch duct 45.

Namely, the duct structure shown in FIG. 3 is that the mode switching box 20 of the air conditioning unit 17 and the side vent blowoff port 42 are connected by the side vent duct 40, and there is provided a front pillar air conditioning duct (see the ducts 45, 46 and an air conditioning duct 55 which will be described below) which diverges from the middle portion of an end side of the side vent duct 40, extends along the front pillar 13, and connects with the front-pillar conditioned-air blowoff port 47. Accordingly, the duct structure can be simplified and a duct layout can be improved in the instrument panel 16.

Next, a structure of the front pillar 13 including the front pillar duct 46 will be described referring to FIGS. 7 through 11.

Figure 7:
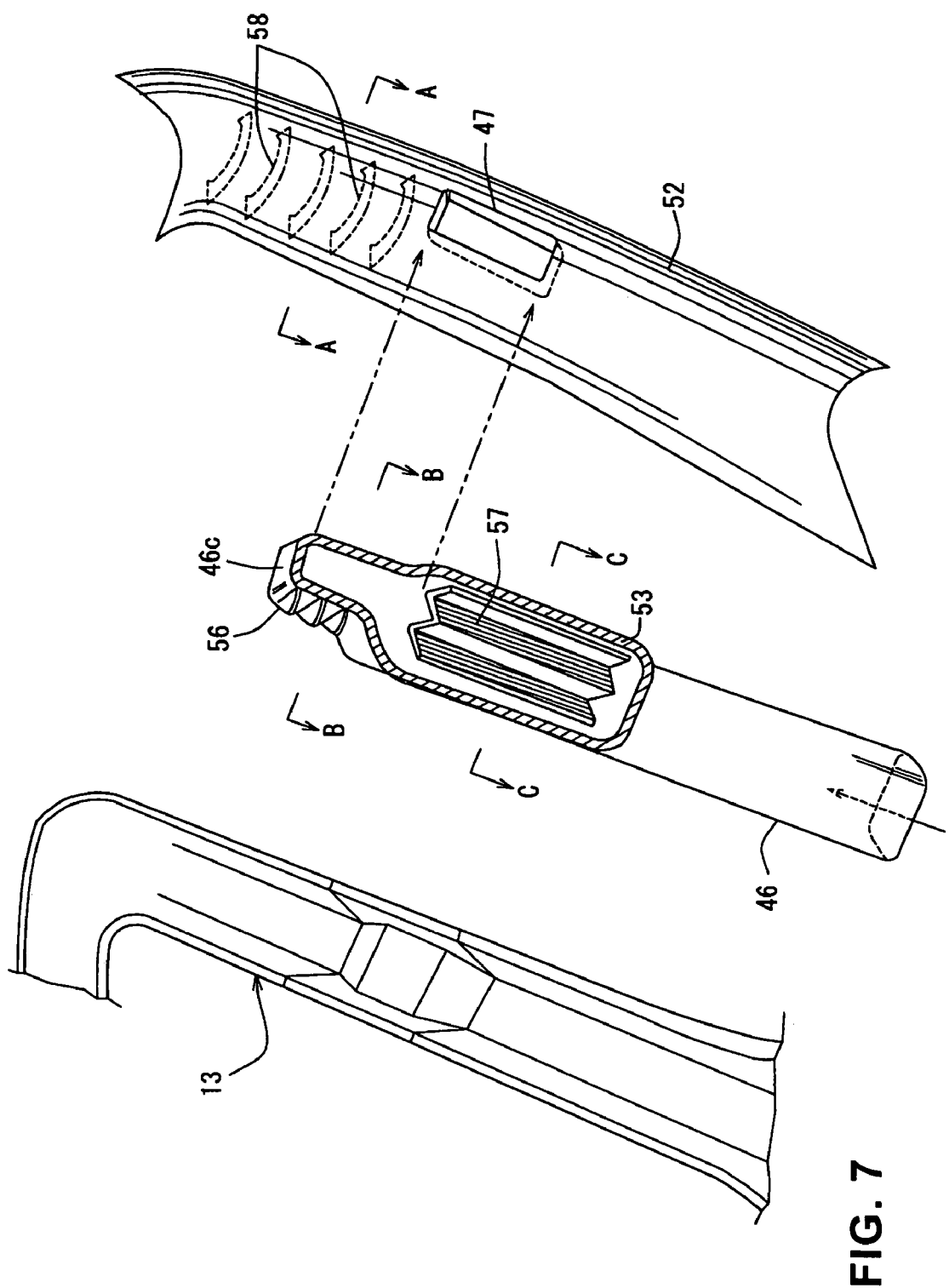
FIG. 7 is an exploded perspective view of a front pillar, a front pillar duct and a trim.
Figure 8:
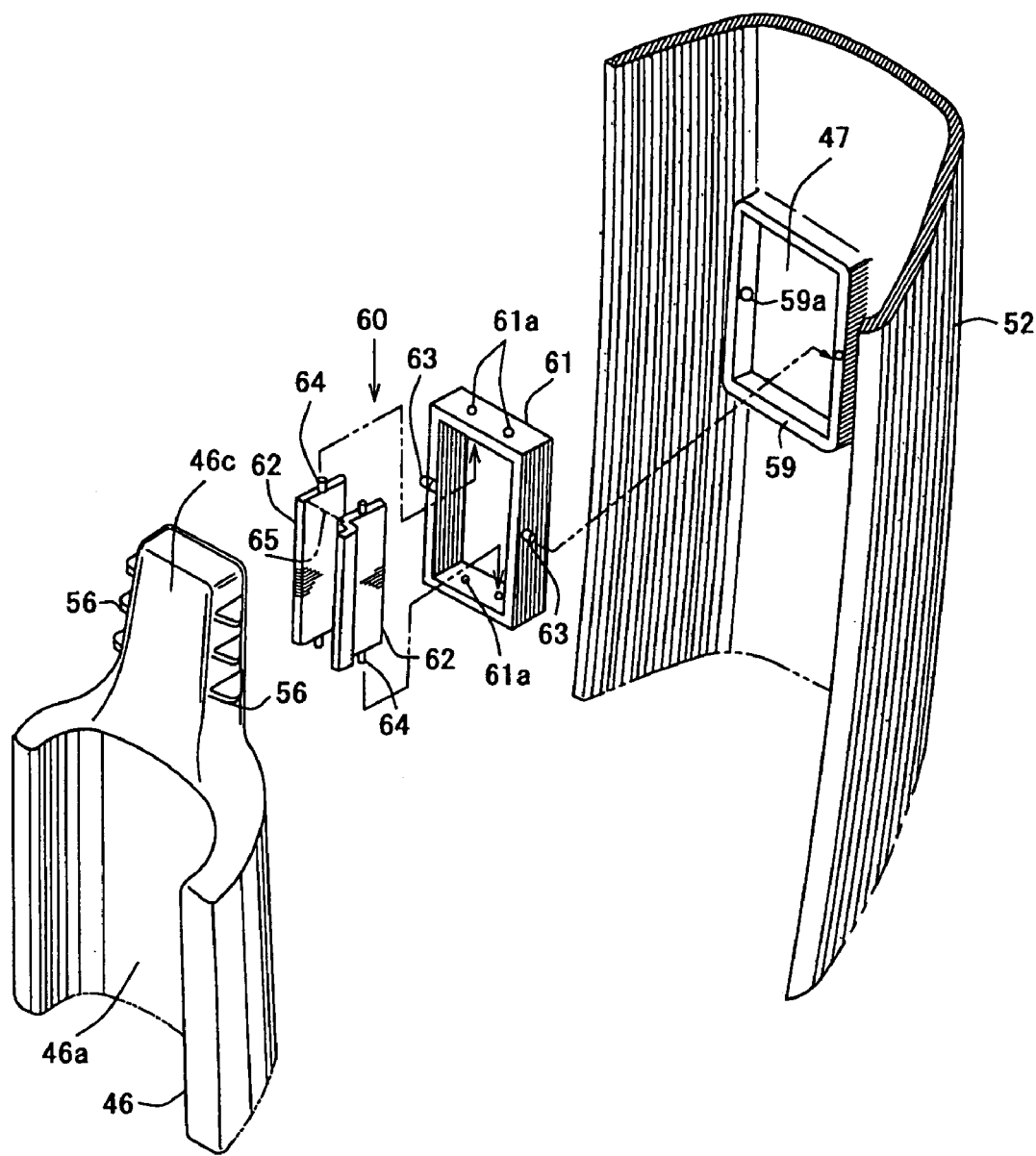
FIG. 8 is an exploded perspective view of the front pillar duct, a louver device and the trim.
Figure 9:
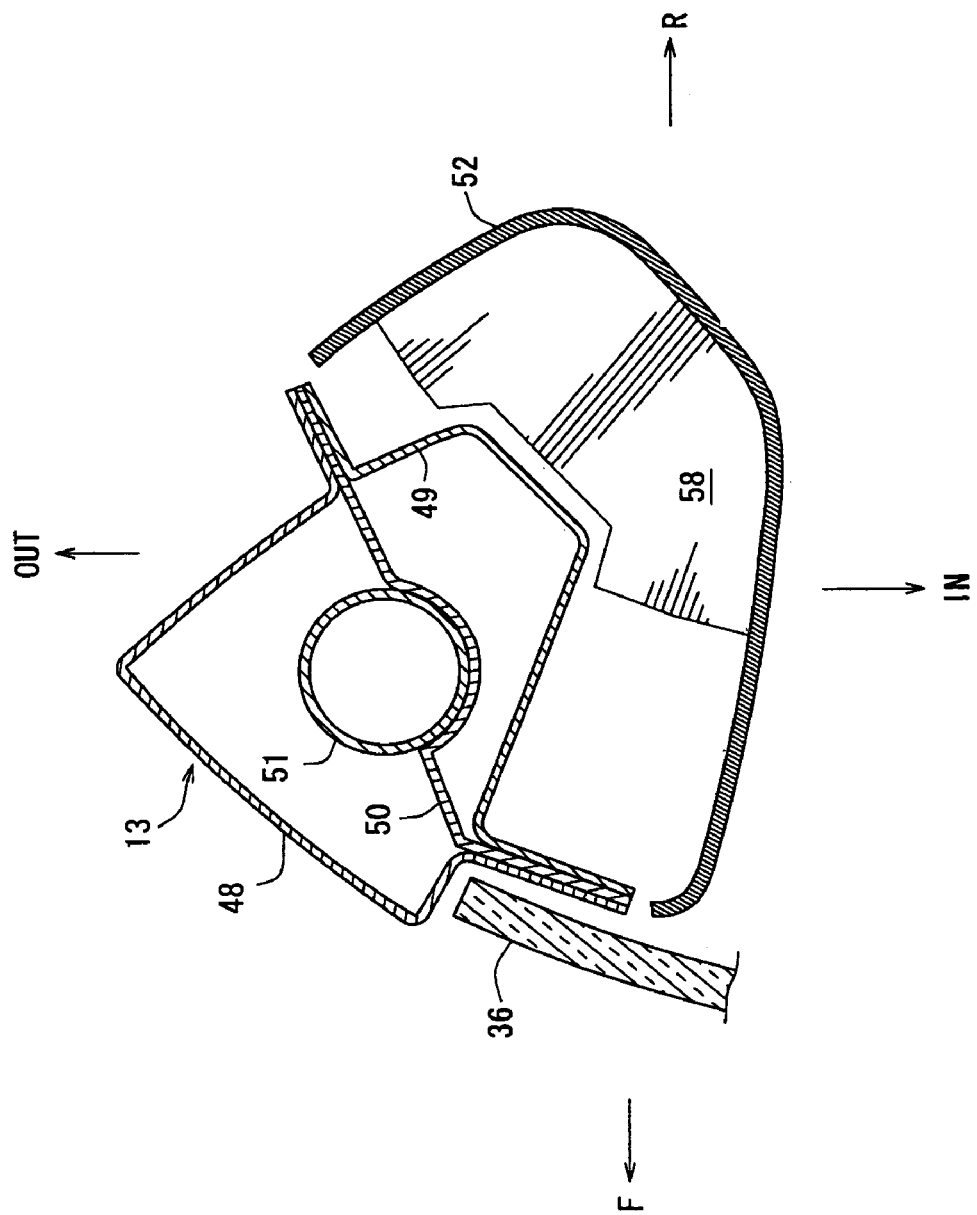
FIG. 9 is a sectional view of a front pillar portion taken on line A-A of FIG. 7.
Figure 10:
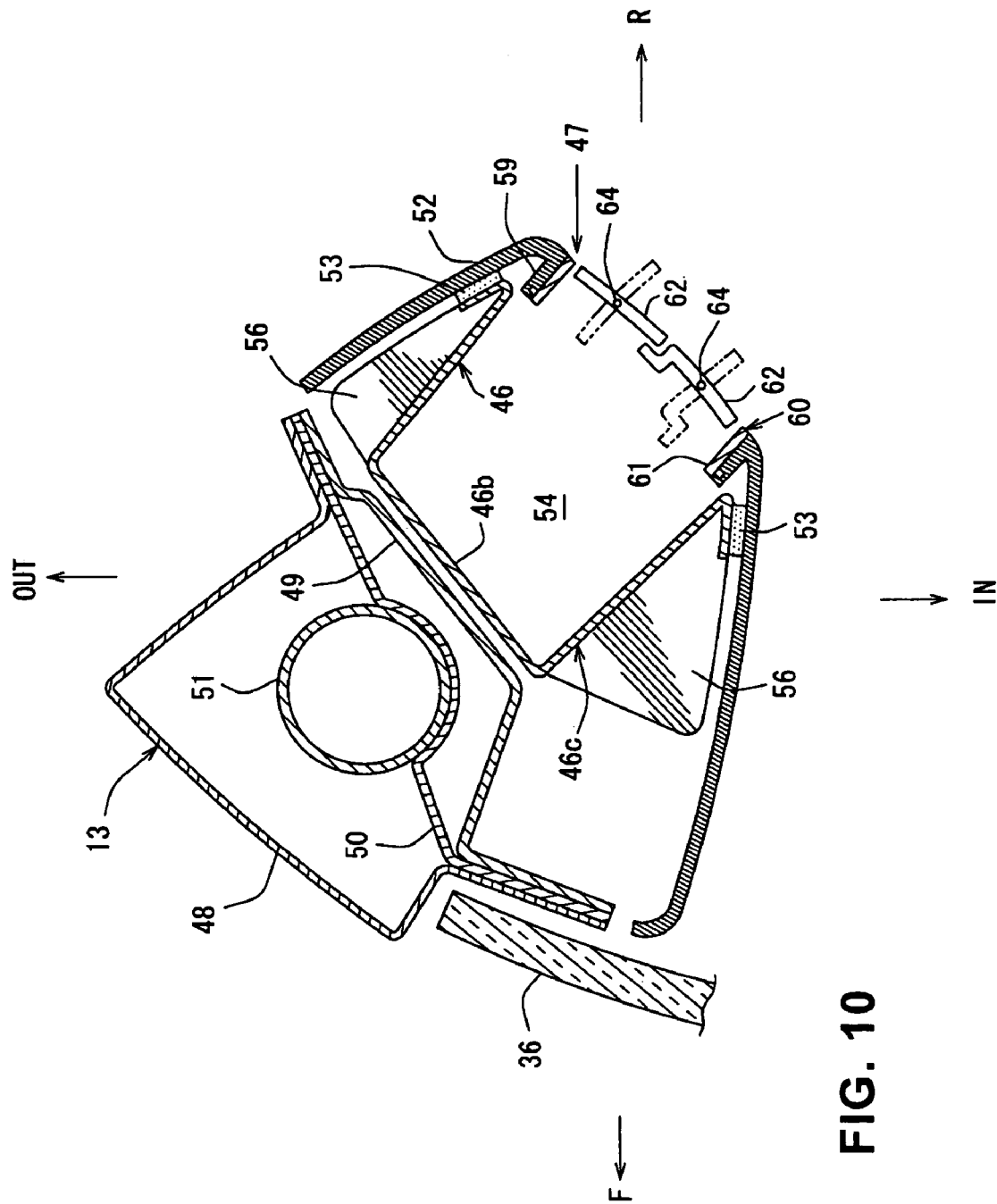
FIG. 10 is a sectional view of a front pillar portion taken on line B-B of FIG. 7.
Figure 11:
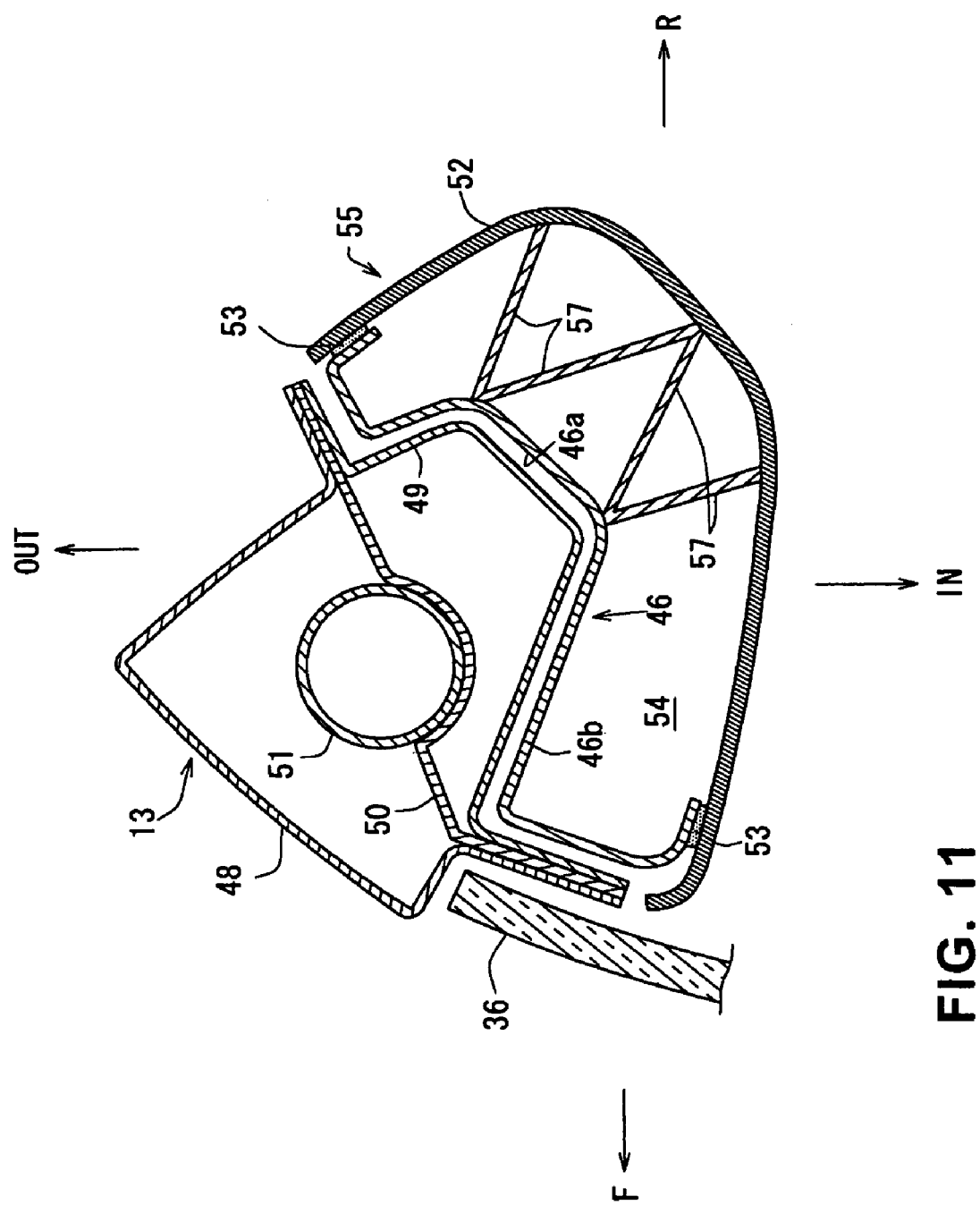
FIG. 11 is a sectional view of a front pillar portion taken on line C-C of FIG. 7.

FIG. 7 is an exploded perspective view, omitting to illustrate the louver device. FIG. 8 is an exploded perspective view illustrating the louver device. FIG. 9 is a sectional view taken on line A-A of FIG. 7. FIG. 10 is a sectional view taken on line B-B of FIG. 7. FIG. 11 is a sectional view taken on line C-C of FIG. 7.

In FIGS. 9 through 11, the front pillar 13 comprises a front pillar outer 48, a front pillar inner 49 and a reinforcement 50, and is provided with a reinforcement pipe 51 which is connected to the reinforcement 50 and extends in a vertical direction within its closed section.

At an inside face of the front pillar inner 49 is provided a front pillar trim 52 via the front pillar duct 46, as shown in FIGS. 7, 8, 10 and 11. The above-described front-pillar conditioned-air blowoff port 47 is disposed at a portion upper from the center of the front pillar trim 52, i.e., at a portion as closer to the passenger as possible.

The front pillar duct 46 is configured, as shown in FIG. 7, such that its lower portion is formed in a duct shape and its upper portion is formed in an open-end shape toward the front pillar trim 52, a closed-loop-shaped open edge of which is formed of an adhesion face 53 illustrated by a hatching. An adhesion of the adhesion face 53 to the front pillar trim 52 constitutes a duct portion to allow the conditioned air to flow therein by the front pillar duct 46 and the front pillar trim 52. Also, a lower end of the front pillar duct 46 is formed in a closed section shape (duct shape) for the branch duct 45, and a middle portion at a back face side (at a side of the front pillar 13) in the vertical direction thereof is formed of a recess portion 46a (see FIGS. 8 and 11) for the front pillar inner 49. Further, a portion of the front pillar duct 46 corresponding to the adhesion face 53, as shown in FIGS. 10 and 11, includes a base portion 46b attached to the front pillar inner 49, and attaching the base portion 46b to the front pillar trim 52 as the duct portion constitutes the air conditioning duct 55 which includes a cylinder portion 54 therein. Namely, the duct for the conditioned air is formed by only the front pillar duct 46 at the lower side from the adhesion face 53 shown in FIG. 7, while the air conditioning duct 55 for the conditioned air is formed by the front pillar duct 46 (duct outer portion) and the front pillar trim 52 (duct inner portion) with its one side facing to the vehicle inside.

Also, the front pillar duct 46 includes a head portion 46c which substantially corresponds to the front-pillar conditioned-air blowoff port 47, and plural rib portions 56 as an impact absorbing portion are formed between an outside face of the head portion 46c and the front pillar trim 52 to absorb an impact load by being deformed by the impact load as shown in FIGS. 7, 8 and 10. In other words, the rib portions 56 are formed of plural ribs which are disposed at intervals of specified distance in the vertical direction between the base portion 46b of the front pillar duct 46 and the front pillar trim 52.

Further, as shown in FIGS. 7 and 11, plural rib portions 57 are provided in the conditioned-air flowing direction (i.e., the direction along the longitudinal direction of the front pillar portion 13) within the cylinder portion 54, and these ribs disposed not to prevent the conditioned air from flowing are configured so as to be destroyed by an impact greater than a specified value. The rib portions 57 of the present invention are provided substantially in zigzags between the base portion 46b of the front pillar duct 46 and the front pillar trim 52. Also, as shown in FIGS. 7 and 9, plural rib portions 58 for impact absorption are formed integrally with the face of the front pillar trim 52 at the side of the front pillar 13 which is located upper from the front-pillar conditioned-air blowoff port 47, and these are configured so as to absorb an impact energy during the vehicle collision by being deformed by the impact energy.

As shown in FIGS. 8 and 10, a rectangular-shaped attachment portion 59 (so-called attachment frame) which protrudes toward the front pillar inner 49 is formed integrally at a hole edge of the front-pillar conditioned-air blowoff port 47 of the front pillar 52, and a louver device 60 as a louver portion is attached to the attachment portion 59. This louver device 60, which deflects the conditioned air flowing in the air conditioning duct 55 toward a specified direction, comprises a rectangular-shaped louver box 61 which is provided inside the above-described attachment portion 59 and plural louvers 62, 62 (so-called fins) which are attached to the louver box 61. At both sides of the louver box 61 are provided support axes 63, 63 which are pivotally supported in support holes 59a of the attachment portion 59, and at upper and lower sides thereof are provided support axes 64, 64 which are pivotally supported in support holes 61a of the louver box 61. Further, a connecting rod 65 which interconnects the plural louvers 62, 62 to rotate together is provided via a pin connection.

Herein, by inserting the respective support axes 64, 64 of the upper and lower ends of the louvers 62, 62 into the support holes 61a, 61a of the louver box 61 and then inserting the respective support axes 63, 63 of the louver box 61 into the support holes 59a, 59a of the attachment portion 59 at the front pillar trim 52, the louver box 61 can be rotated in the vertical direction around the support axes 63 and the plural louvers 62, 62 in the louver box 61 are rotated together in the vehicle width direction around the support axes 64. Accordingly, the conditioned air can be blown off toward proper directions regardless of the body size of passengers.

Namely, the louver device 60 is configured such that the blowoff direction of the conditioned air is adjustable within a specified angle in the vertical direction and within a specified angle in the vehicle width direction, thereby adjusting the conditioned-air blowoff-direction properly according to the body size of passengers.

Figure 12:
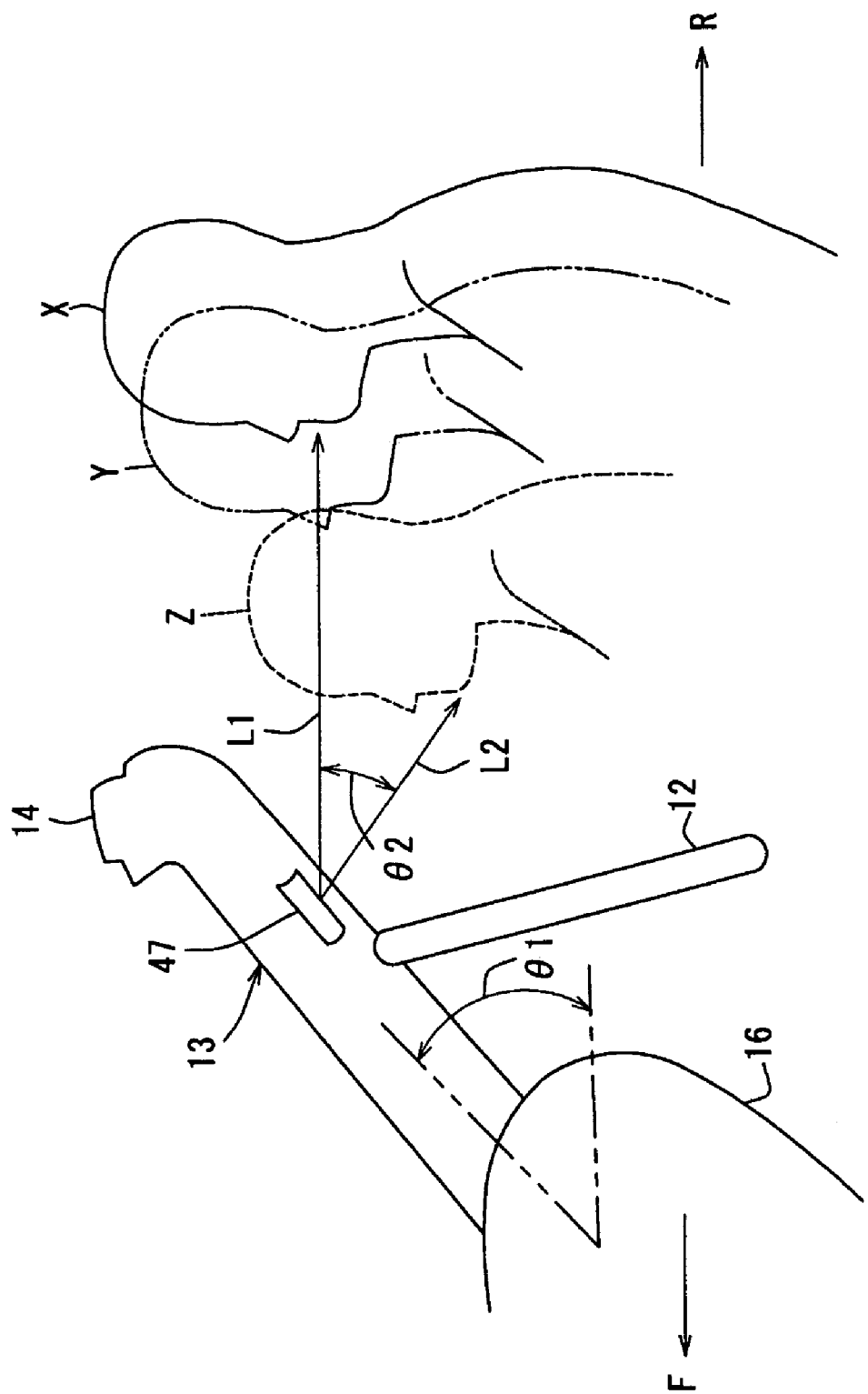
FIG. 12 is a side view showing a blowoff angle of conditioned air.
Figure 13:
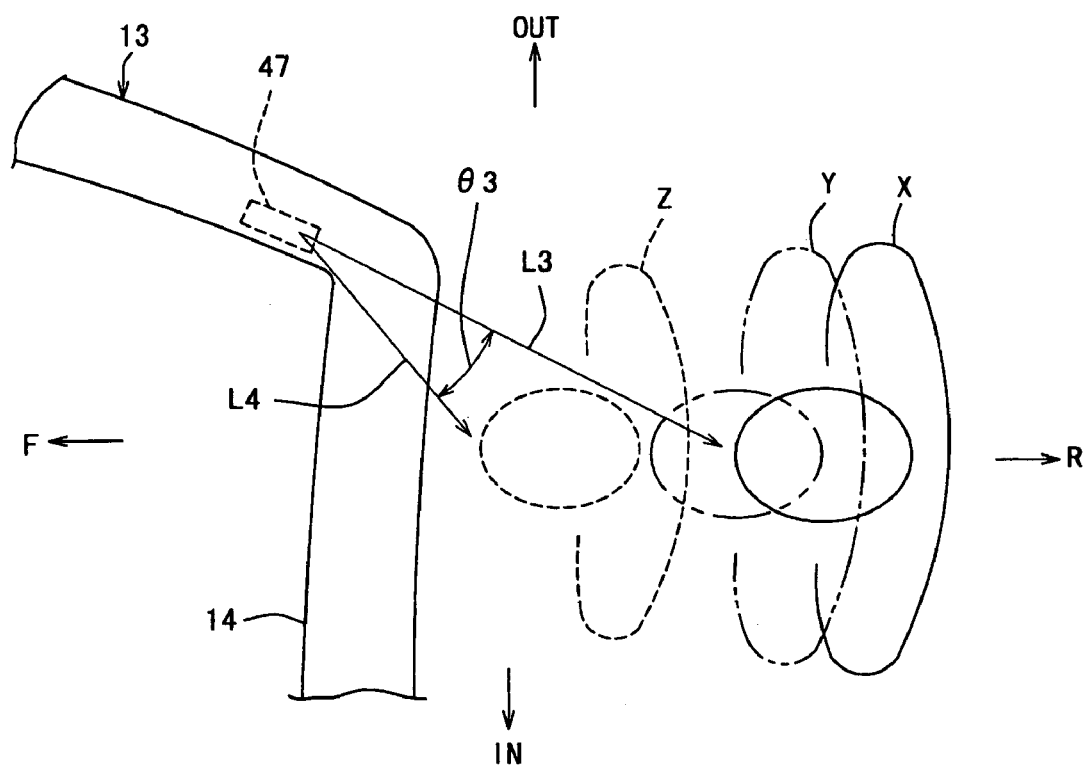
FIG. 13 is a plan view showing a blowoff angle of the conditioned air.

The louver device 60 provided at the front-pillar conditioned-air blowoff port 47 deflects the conditioned air toward the neck and head portions of the passenger, and it deflects the conditioned air within an angle θ2 which is smaller than a slant angle θ1 (an attack angle of the front pillar 13 when a beltline of the vehicle is placed horizontally) of the front pillar 13, as shown in FIG. 12 of the side view. Specifically, an upper limit L1 of a conditioned-air blowoff line by the louver device 60 is approximately parallel to the belt line of the vehicle, and a lower limit L2 is set so as to have an angle difference of 28-30 degrees with respect to the upper limit L1 (see the angle θ2). Meanwhile, the conditioned-air blowoff direction from the louver device 60 in a plan view is adjustable appropriately within an angle defined by a line L3 which is on an extending line of the front pillar 13 and a line L4 which has an angle difference of 22-24 degrees with respect to the upper limit L3, as shown in FIG. 13.

Namely, the seats 7, 8 are adjustable in the longitudinal direction according to the body size of passengers, for example, according to the big-size one X, the middle-size one Y, and the small-size one Z, and the louver device 60 is configured so as to blow off the conditioned air toward the neck and head portions of such passengers X, Y and Z even when the sitting positions have been adjusted according to the body size of passengers. As a result, the louver device 60 can blow off concentrated conditioned air toward the neck and head portions properly regardless of the body size of the passengers X, Y and Z. Herein, although not being illustrated in FIGS. 12 and 13, the louver device 60 is provided at the attachment portion 59 in the front-pillar conditioned-air blowoff port 47 as described above.

Although the louver device 60 (louver portion) shown in FIG. 8 is configured such that the louver box 61 is rotated in the vertical direction and the louver 62 is rotated in the vehicle width direction, its another structure with the louver box being rotated in the vehicle width direction and the louver being rotated in the vertical direction may be adopted. Namely, as another embodiment of the louver device 60 shown in FIG. 14, this louver device 60 comprises the rectangular-shaped louver box 61 provided inside the attachment portion 59 of the front pillar trim 52 and plural louvers 62, 62 (so-called fins) attached to the louver box 61. At both sides of the louver box 61 are provided support axes 63, 63 which are pivotally supported in support holes 59a, 59a of the attachment portion 59, and at right and left sides of the plural louvers 62 are provided support axes 64, 64 which are pivotally supported in support holes 61a ... of the louver box 61. Further, the connecting rod 65 which interconnects the plural louvers 62 ... to rotate together is provided via the pin connection.

Figure 14:
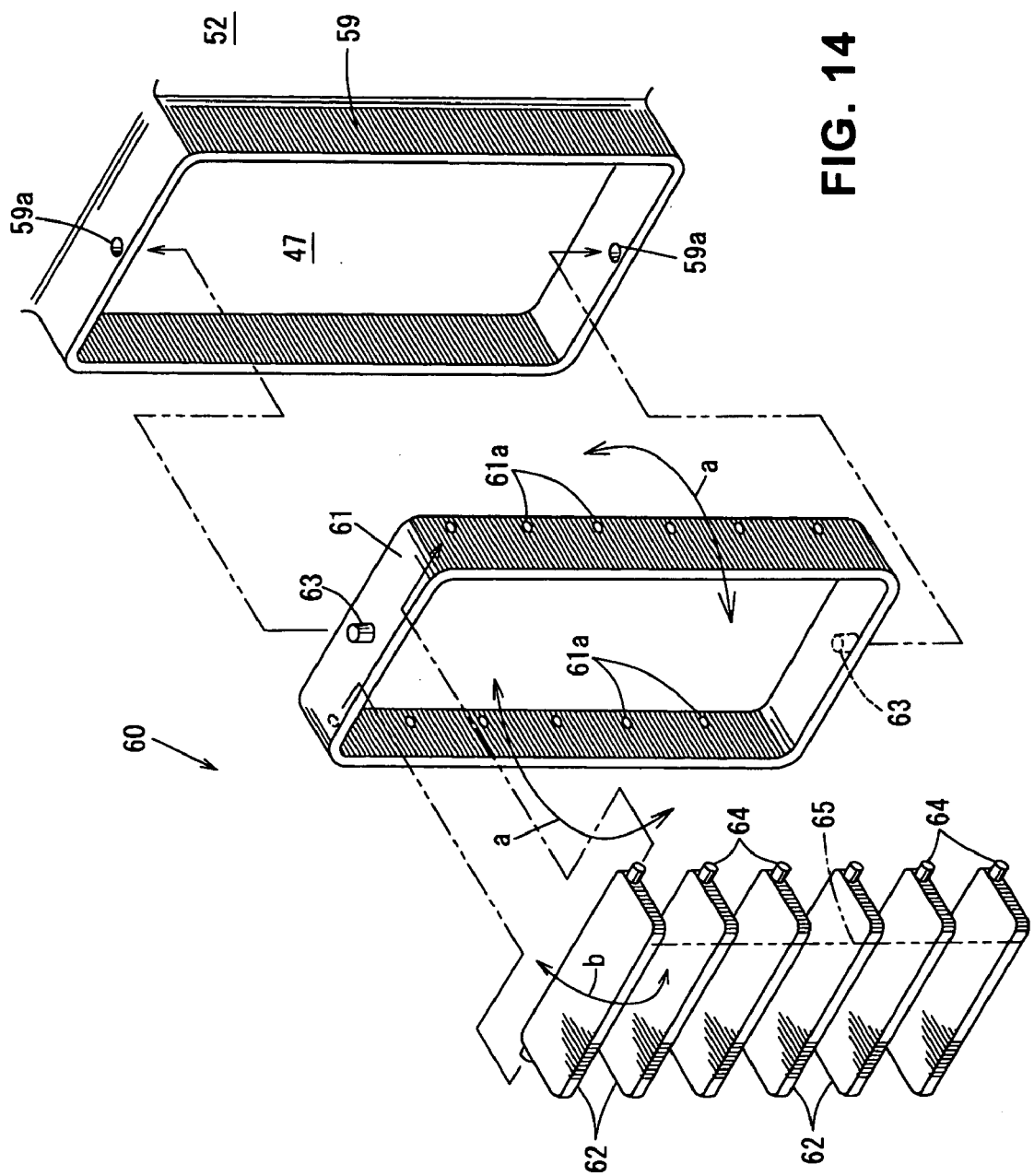
FIG. 14 is a perspective view of another embodiment of a louver device.

Herein, by inserting the respective support axes 64 ... of the right and left ends of the louvers 62 ... into the support holes 61a, 61a of the louver box 61 and then inserting the respective support axes 63, 63 of the louver box 61 into the support holes 59a, 59a of the attachment portion 59 at the front pillar trim 52, the louver box 61 can be rotated in the vehicle width direction denoted by an arrow a in FIG. 14 around the support axes 63, and the plural louvers 62 ... in the louver box 61 are rotated together in the vertical direction denoted by an arrow b in FIG. 14 around the support axes 64. Accordingly, even if the sitting positions of different sized passengers X, Y and Z have been changed in the longitudinal direction, the conditioned-air blowoff direction can be adjusted properly according to the passengers X, Y and Z and the conditioned air can be blown off toward proper directions regardless of the body size of passengers.

Since the louver device 60 shown in FIG. 14 can also provide the same constitution as the louver device 60 shown in FIG. 8, i.e., the conditioned-air blowoff direction is adjustable within specified angles in the vertical direction and the vehicle width direction as shown in FIGS. 12 and 13, the structures shown in FIG. 14 which have identical or similar functions to ones shown in FIG. 8 have the same reference numerals and their detailed descriptions will be omitted.

Figure 15:
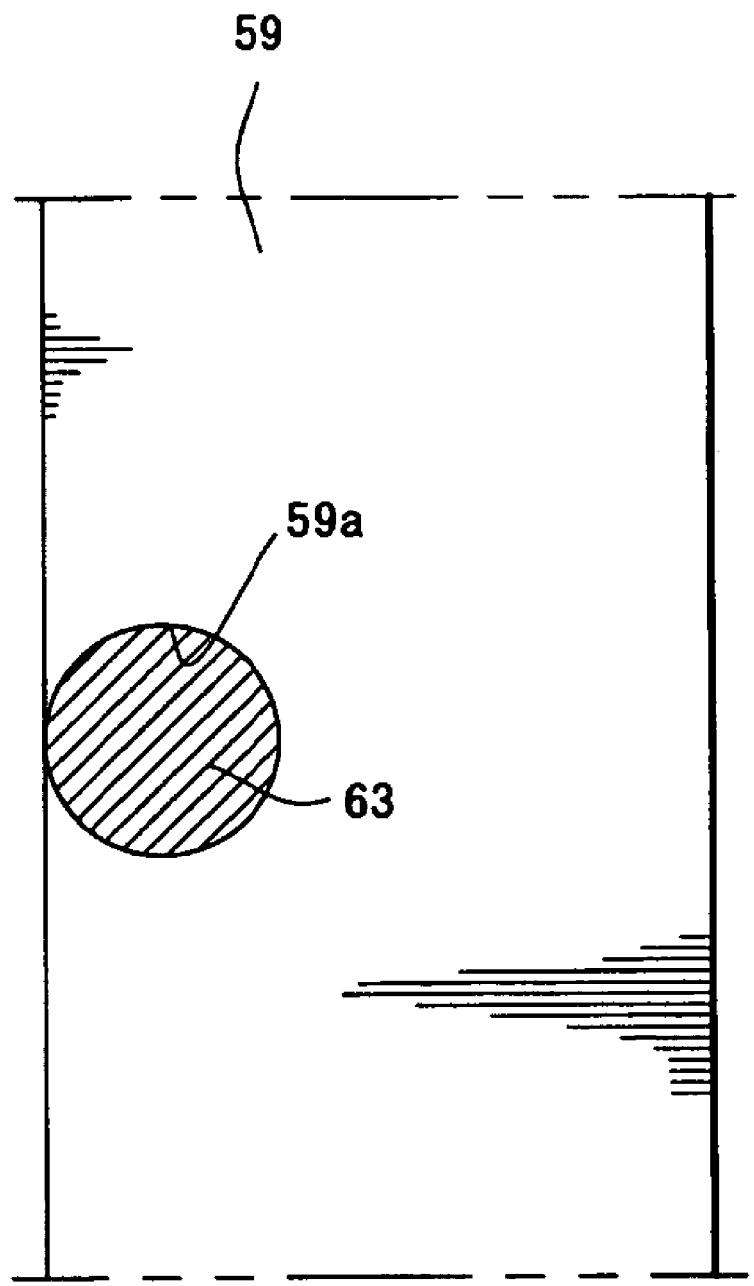
FIG. 15 is a partial view showing a detachment structure of the louver device when an impact load acts.

FIG. 15 is a partial view showing a relationship between the attachment portion 59 of the front pillar trim 52 shown in FIG. 8 and the support axis 63 of the louver box 61. The support axis 63 is pivotally supported such that its outer peripheral portion is located just or substantially at an inner end of the attachment portion 59, so that the support axis 63 can be detached from the attachment portion 59 when an impact load grater than a specified value acts on the front pillar trim 52 from the passenger compartment of the vehicle during the vehicle collision. Thus, because the louver device 60 is detached from the front pillar trim 52 as a duct portion accordingly, the security of the passenger's head portion can be maintained.

Figure 16:
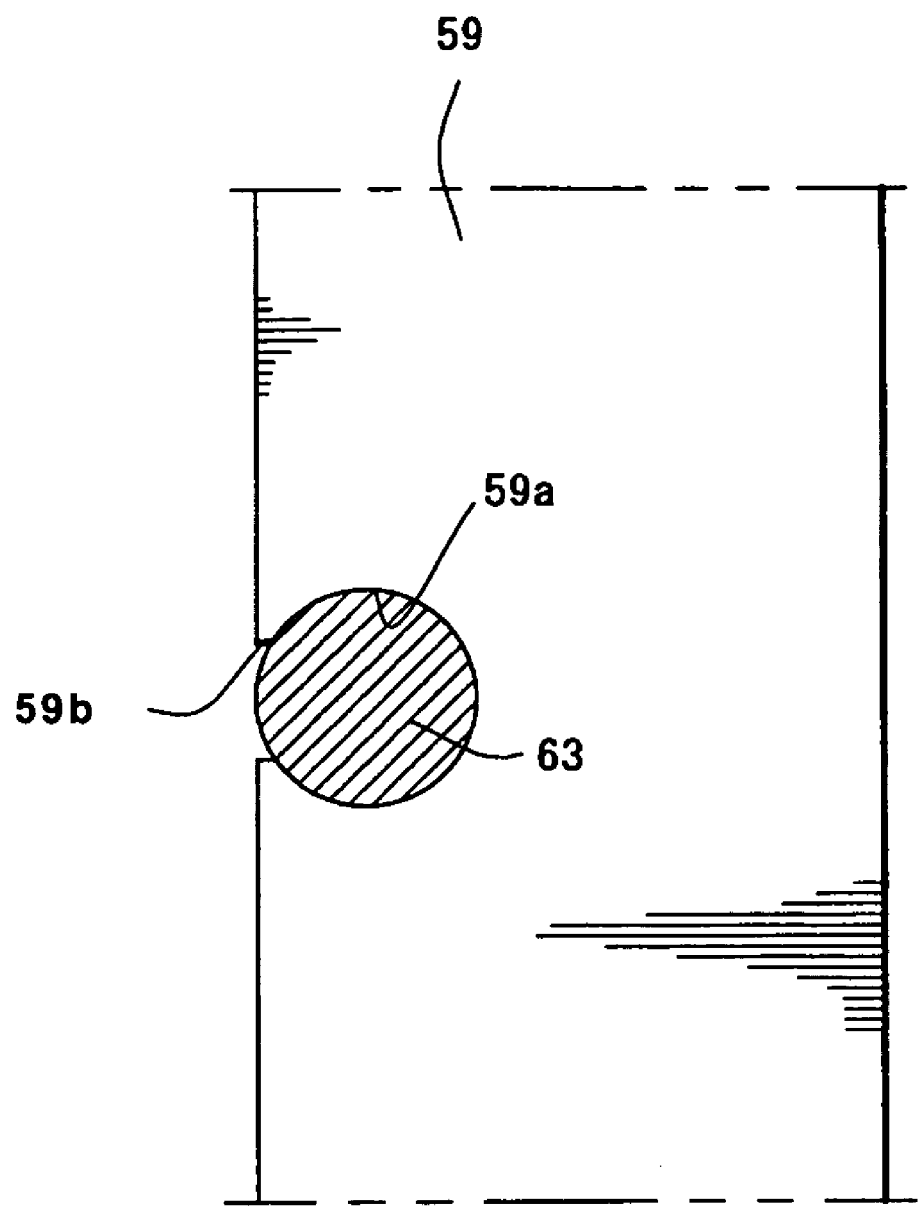
FIG. 16 is a partial view showing another embodiment of the detachment structure.
Figure 17:
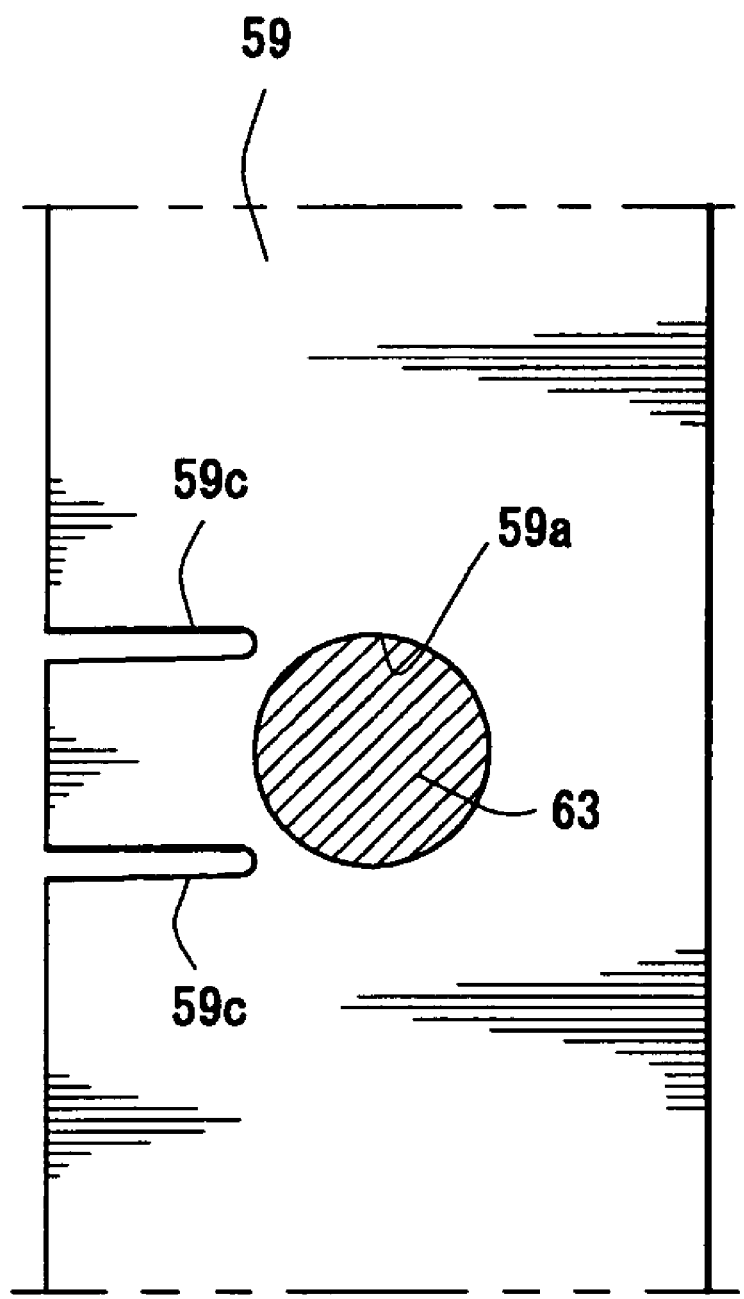
FIG. 17 is a partial view showing further another embodiment of the detachment structure.

Other structures shown in FIGS. 16 and 17 may be applied instead of the one shown in FIG. 15. Namely, FIG. 16 shows a structure in which a recess groove 59b with its diameter which is smaller than the diameter of the support hole 59a is formed at the support hole 59a, and the support axis 63 of the louver box 61 shown in FIG. 8 is pivotally supported by the support hole 59a. In this structure, when the impact load grater than the specified value acts from the passenger compartment, the louver device 60 is detached from the front pillar trim 52, and thereby the security of the passenger's head portion can be maintained. FIG. 17 shows a structure in which weak portions 59c, 59c configured of recess grooves are formed at the inside of the support hole 59a at the attachment portion 59. Similarly, when the impact load grater than the specified value acts from the passenger compartment, the louver device 60 is detached from the front pillar trim 52, and thereby the security of the passenger's head portion can be maintained. According to the structure shown in FIG. 17, the support hole 59a can be formed at a middle or center portion of the attachment portion 59.

Meanwhile, a switching portion 66 shown in FIGS. 18 through 21 is provided at connection between the side vent duct 40 shown in FIG. 6, the branch duct 45 and the side vent blowoff port 42 as a side vent blowoff portion. The switching portion 66 comprises two split upper and lower cases 67 and 68 shown in FIG. 21, and constitutes a vent passage 69 which connects the side vent duct 40 with the side vent blowoff port 42 and a front-pillar side passage 70 which connects the side vent duct 40 with the branch duct 45 when these cases 67 and 68 are assembled.

At a bearing portion 71 of a case wall forming the vent passage 69, a door shaft 73 equipped with a gear 72 at its outside end is pivotally supported. A door 74 fixed on the door shaft 73 opens and closes the vent passage 69. Also, a door shaft 77 equipped with a gear 76 at its inside end is pivotally supported at a bearing portion 75 of a case wall forming the front-pillar side passage 70. A door 78 fixed on the door shaft 77 opens and closes the front-pillar side passage 70.

Figure 22:
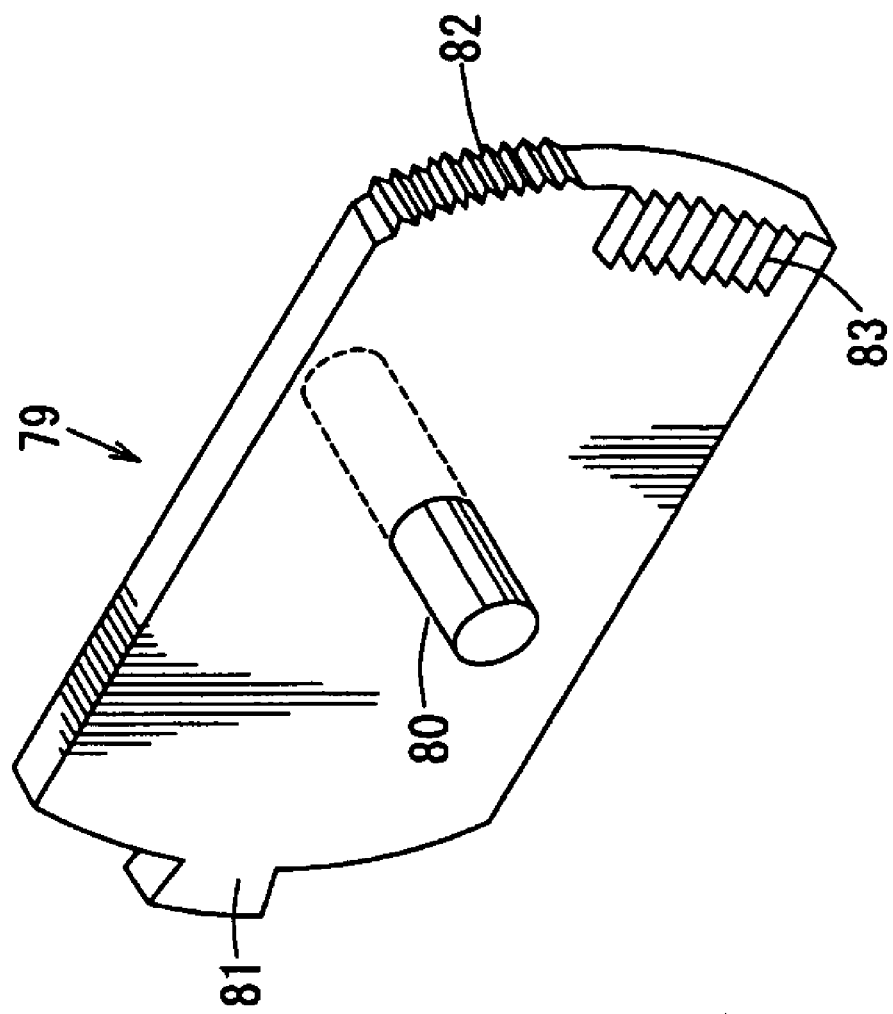
FIG. 22 is an enlarged perspective view of an operational lever.
Figure 23:
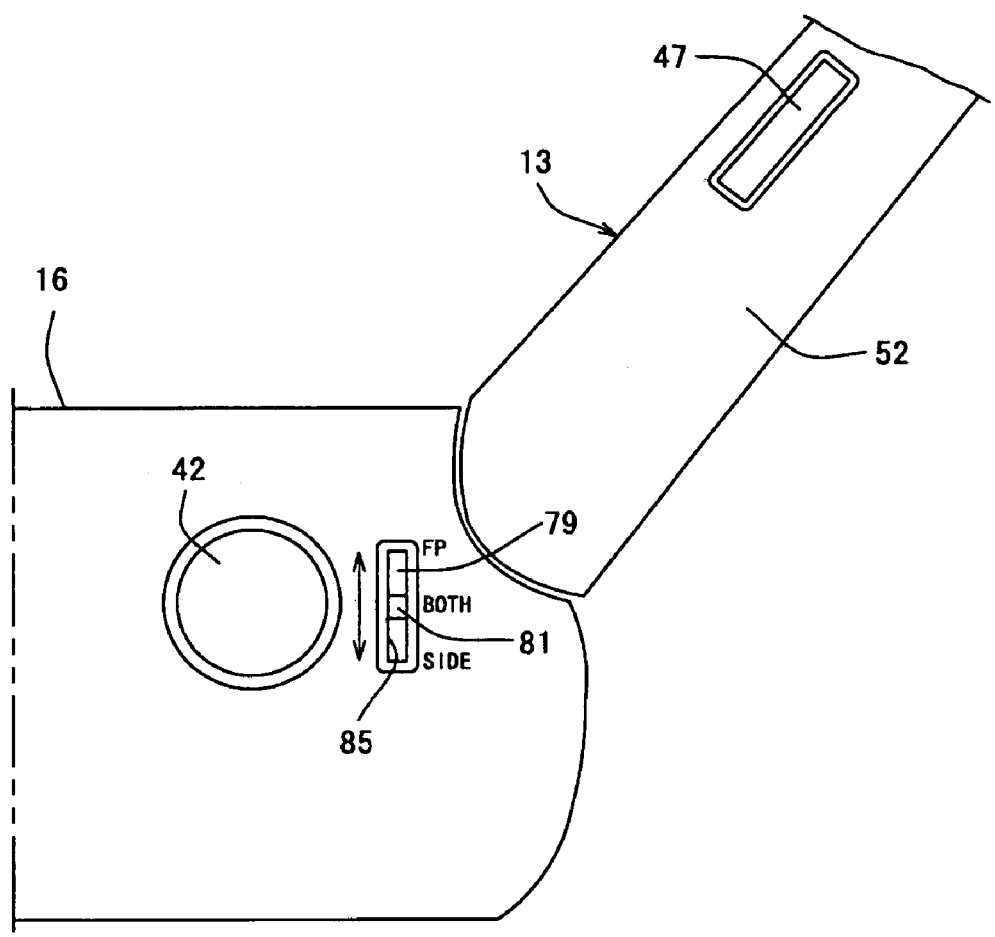
FIG. 23 is an explanatory view of a layout of the operational lever.

Further, there is provided an operational lever 79 as a blowoff air adjusting device to control the doors 74 and 78 at the same time, which controls the blowoff amount from the side vent blowoff port 42 and the front-pillar conditioned-air blowoff port 47. The operational lever 79 comprises, as shown in FIG. 22 as well, a support axis 80, an operational knob 81, a gear 82 fixed to a lever rear end to drive the above-described 72, and a gear 83 provided at a lever side face portion to drive the gear 76. The support axis 80 is pivotally supported by the bearing portion 84 at the case wall, the gear 82 at the lever rear end side is engaged with a gear 72 at the side of the door 74, the gear 83 at the lever side face portion is engaged with the gear 76 at the side of the door 78, and the operational knob 81 of the operational lever 79 is provided so as to extend toward the passenger compartment from an opening portion 85 of the instrument panel 16 as shown in FIG. 23. Accordingly, a manual operation by the passenger from the inside of the passenger compartment of the vehicle can be provided.

Figure 19:
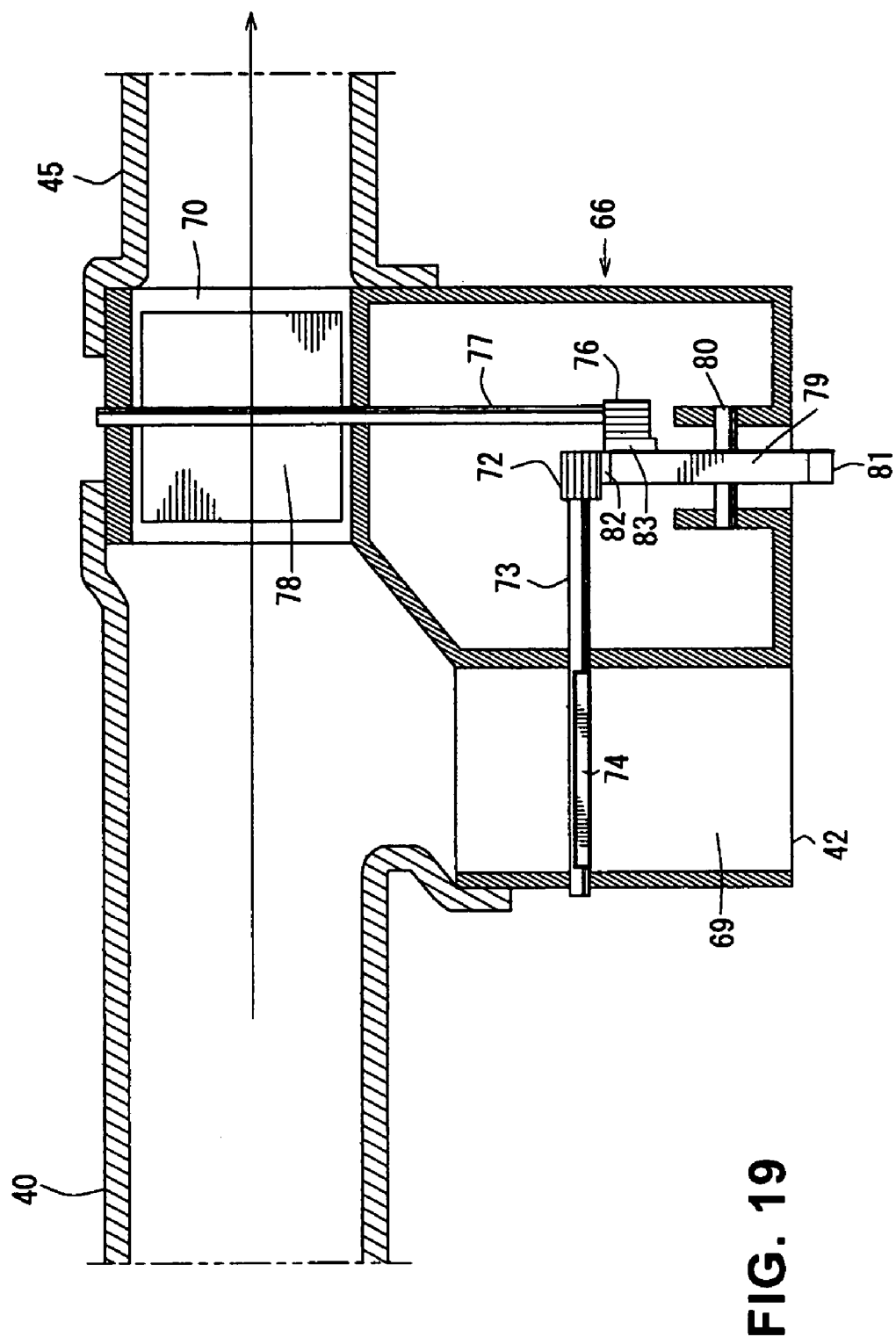
FIG. 19 is a sectional view showing a conditioned-air blowoff state toward the front pillar.

When the operational knob 81 of FIG. 23 is operated toward a FP side (upward in the figure), the door 74 of the vent passage 69 is closed and the door 78 of the front-pillar side passage 70 is opened respectively, by engagements of the gears 82 and 72 and the gears 83 and 76 as shown in FIGS. 19 and 24. Thus, the whole amount of conditioned air of the side vent duct 40 is directed toward the front-pillar conditioned-air blowoff port 47 as shown by an arrow in FIG. 19.

Figure 20:
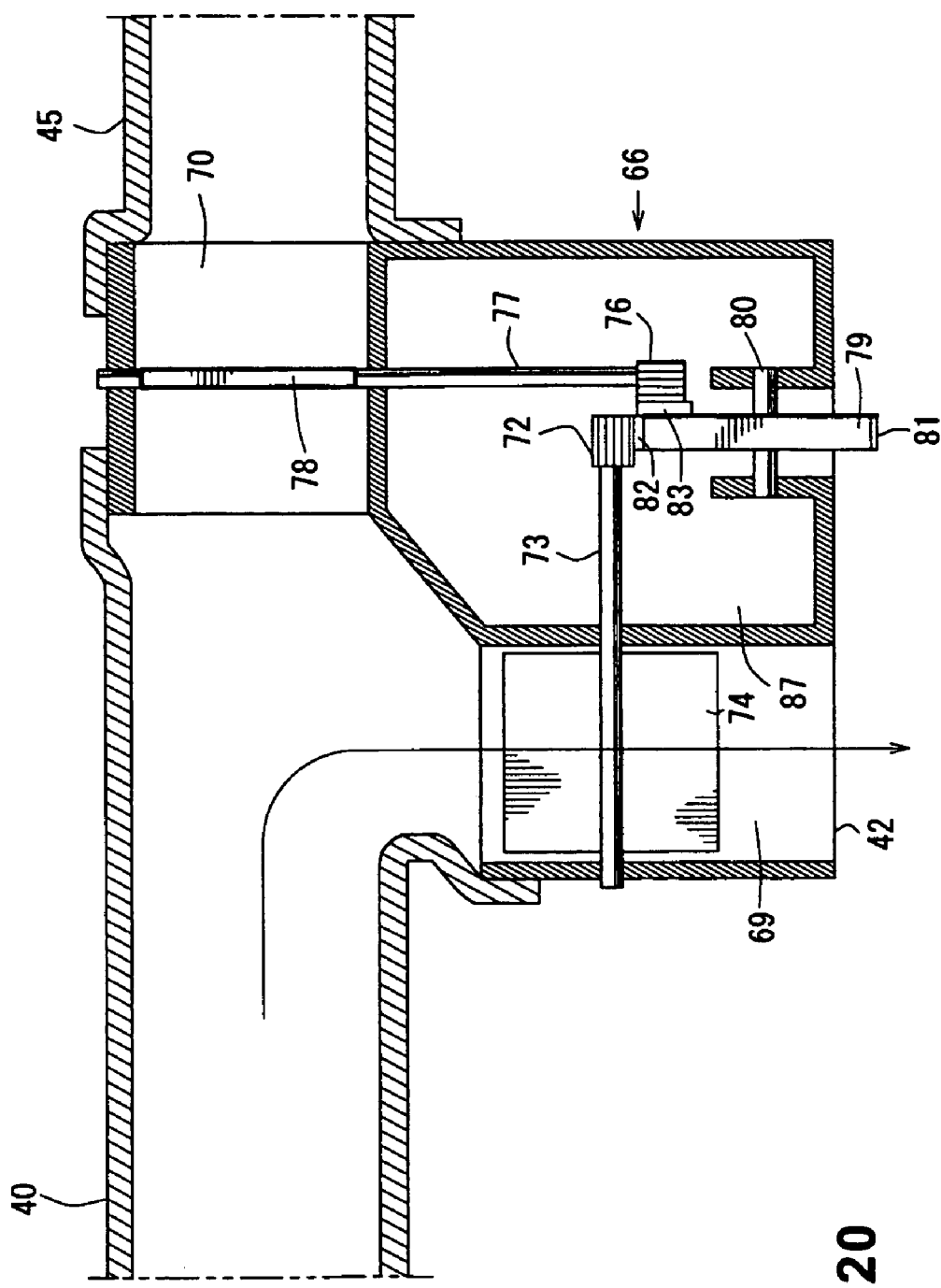
FIG. 20 is a sectional view showing a conditioned-air blowoff state toward a side vent blowoff port.
Figure 21:
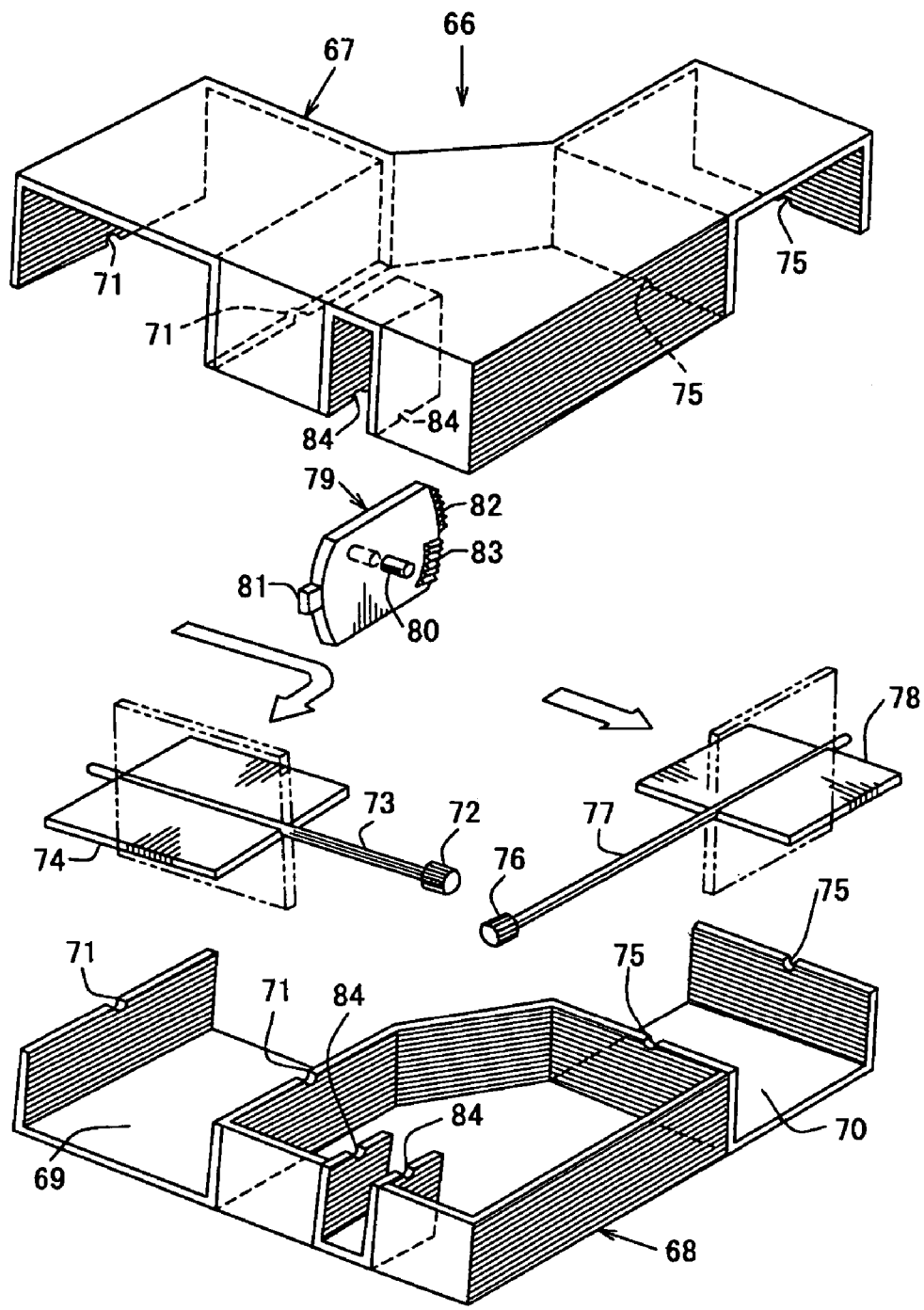
FIG. 21 is an exploded perspective view of the switching portion.

Also, when the operational knob 81 of FIG. 23 is operated toward a SIDE side (downward in the figure), the door 74 of the vent passage 69 is opened and the door 78 of the front-pillar side passage 70 is closed respectively, by engagements of the gears 82 and 72 and the gears 83 and 76 as shown in FIGS. 20 and 24. Thus, the whole amount of conditioned air of the side vent duct 40 is directed toward the side vent port 42 as shown by an arrow in FIG. 20.

Figure 18:
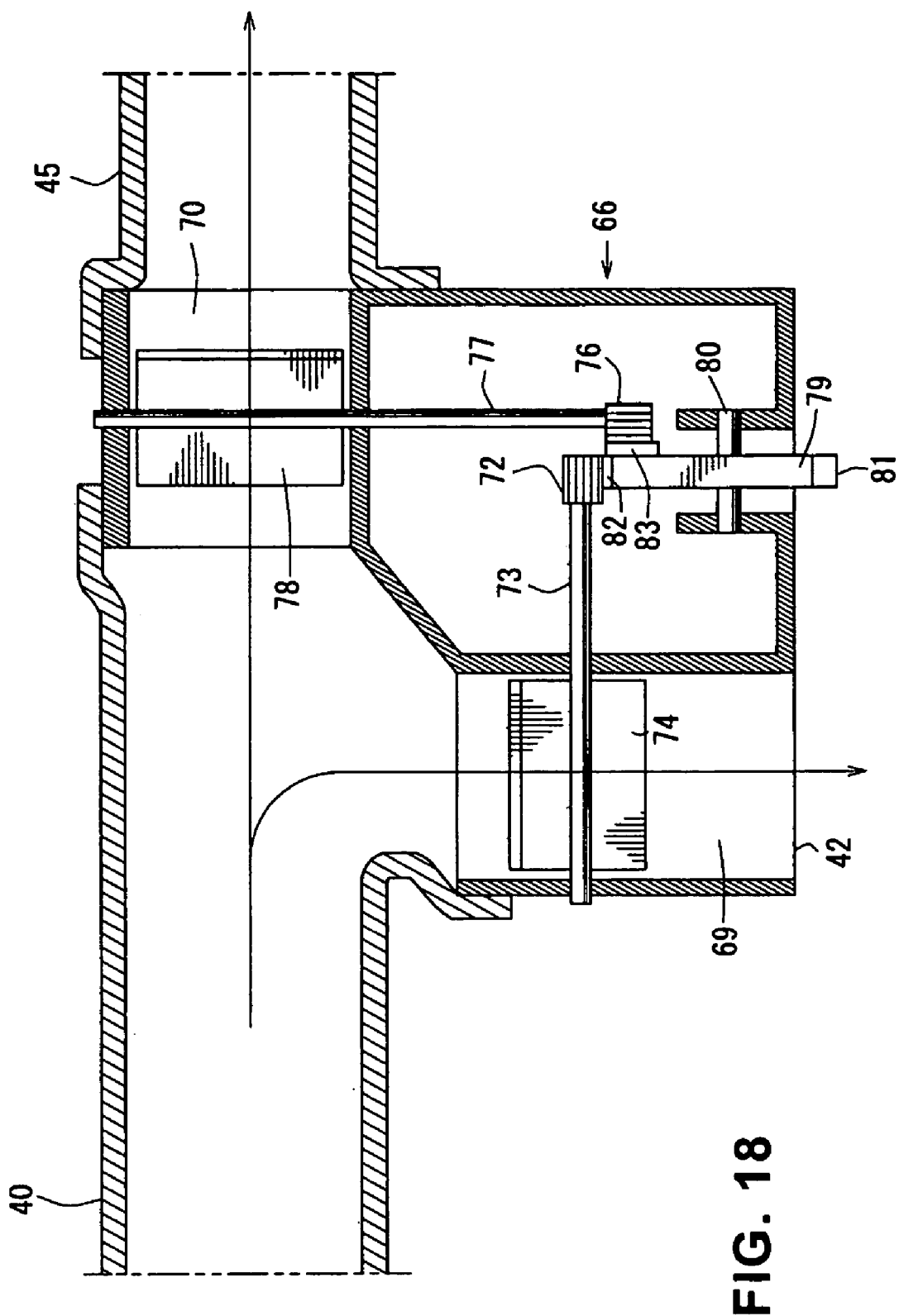
FIG. 18 is a sectional view of a switching portion.

Further, when the operational knob 81 of FIG. 23 is operated to a middle position between the FP side and the SIDE side, i.e., BOTH side, the doors 14 and 78 are opened half respectively, by engagements of the gears 82 and 72 and the gears 83 and 76 as shown in FIGS. 18 and 24. Thus, the conditioned air of the side vent duct 40 is directed toward both the side vent port 42 and the front-pillar conditioned-air blowoff port 47 as shown by an arrow in FIG. 18.

Accordingly, the blowoff-amount control can be attained by the manual operation of the operational lever 79 via the above-described operational knob 81 as shown in FIGS. 18, 19, 20 and 24. In a chart of FIG. 24, FP corresponds to the sate shown in FIG. 19, BOTH corresponds to the sate shown in FIG. 18, and SIDE corresponds to the sate shown in FIG. 20.

Figure 25:
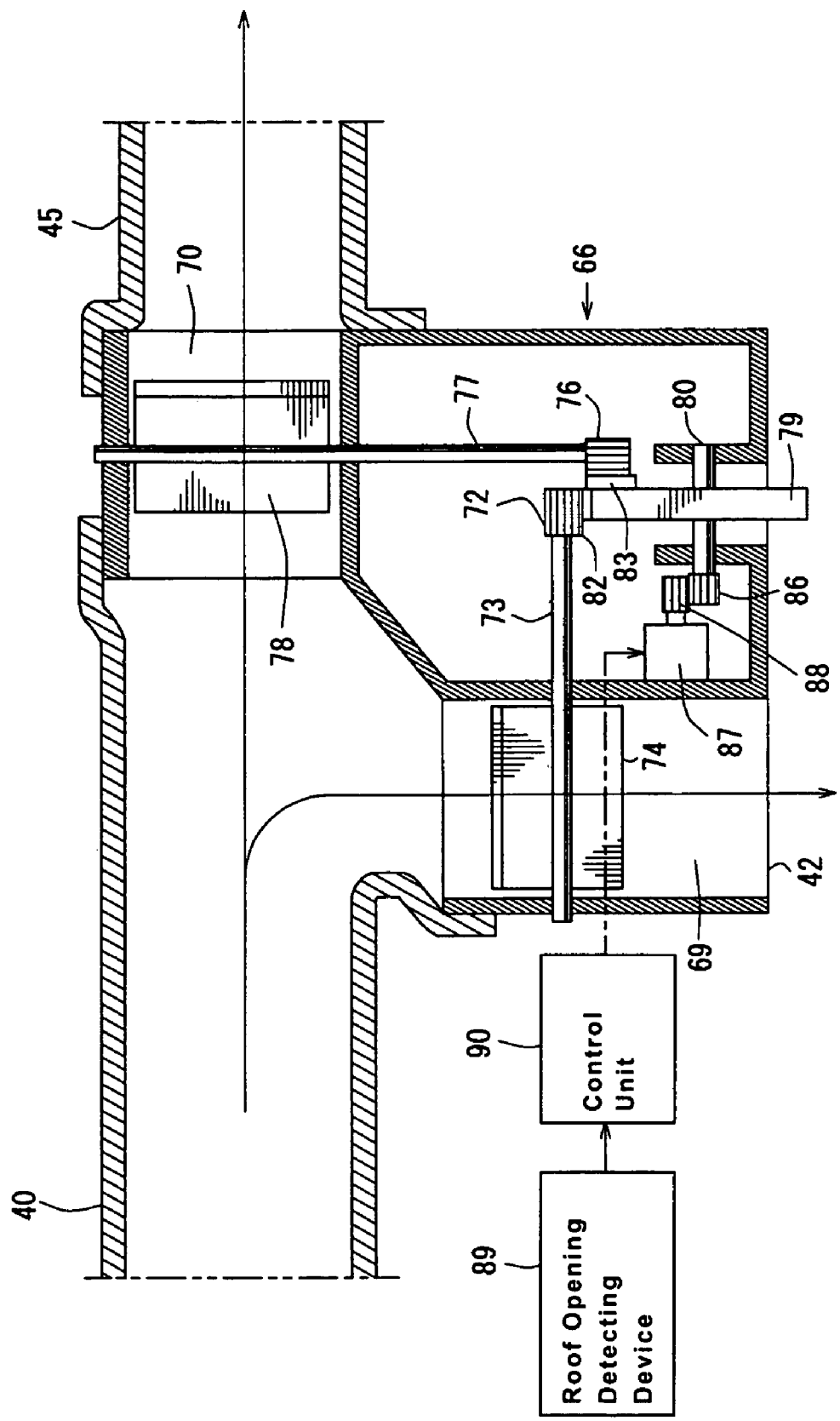
FIG. 25 is a system view showing another embodiment of the switching portion.
Figure 26:
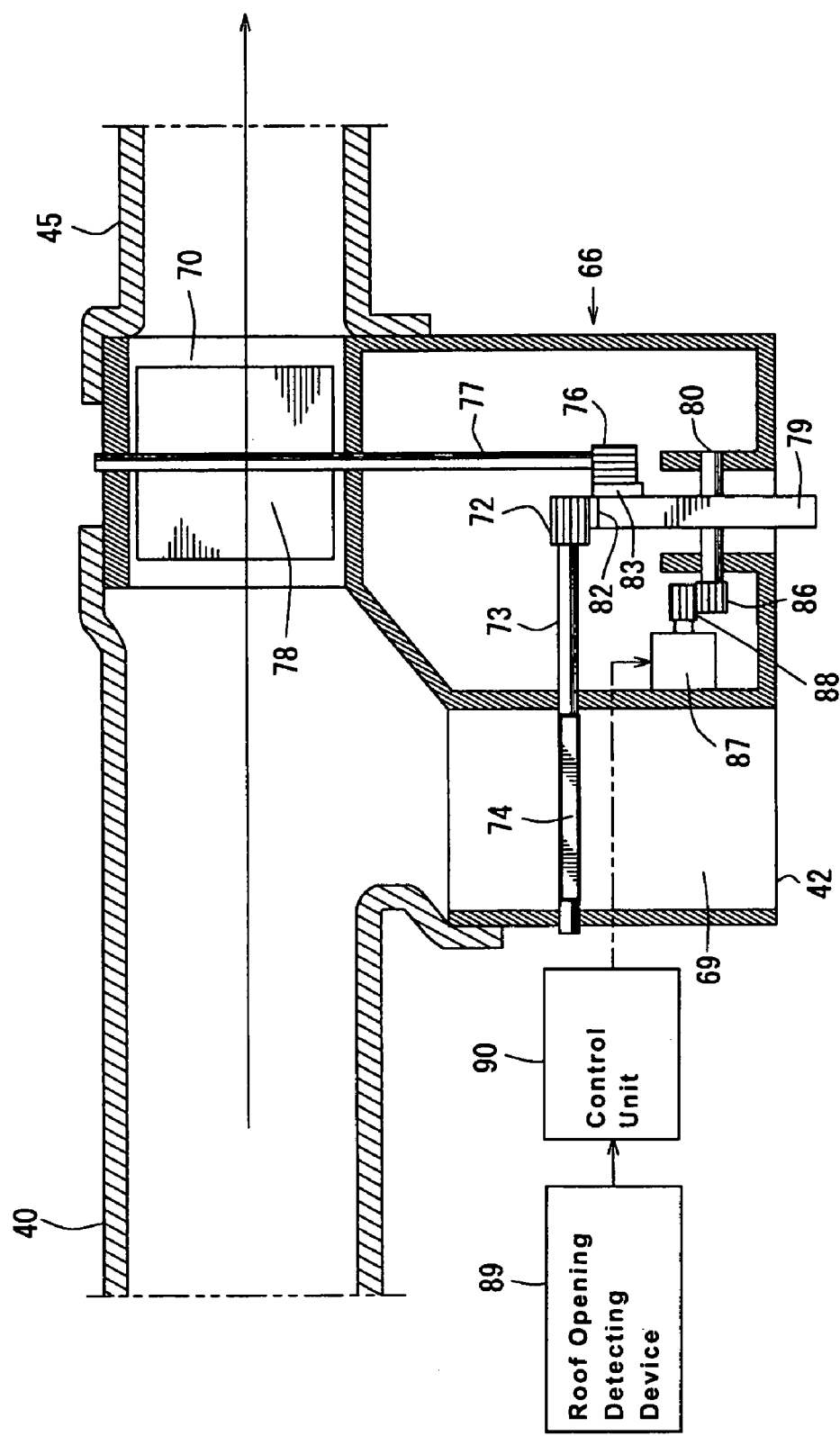
FIG. 26 is a system view showing a conditioned-air blowoff state toward the front pillar.
Figure 27:
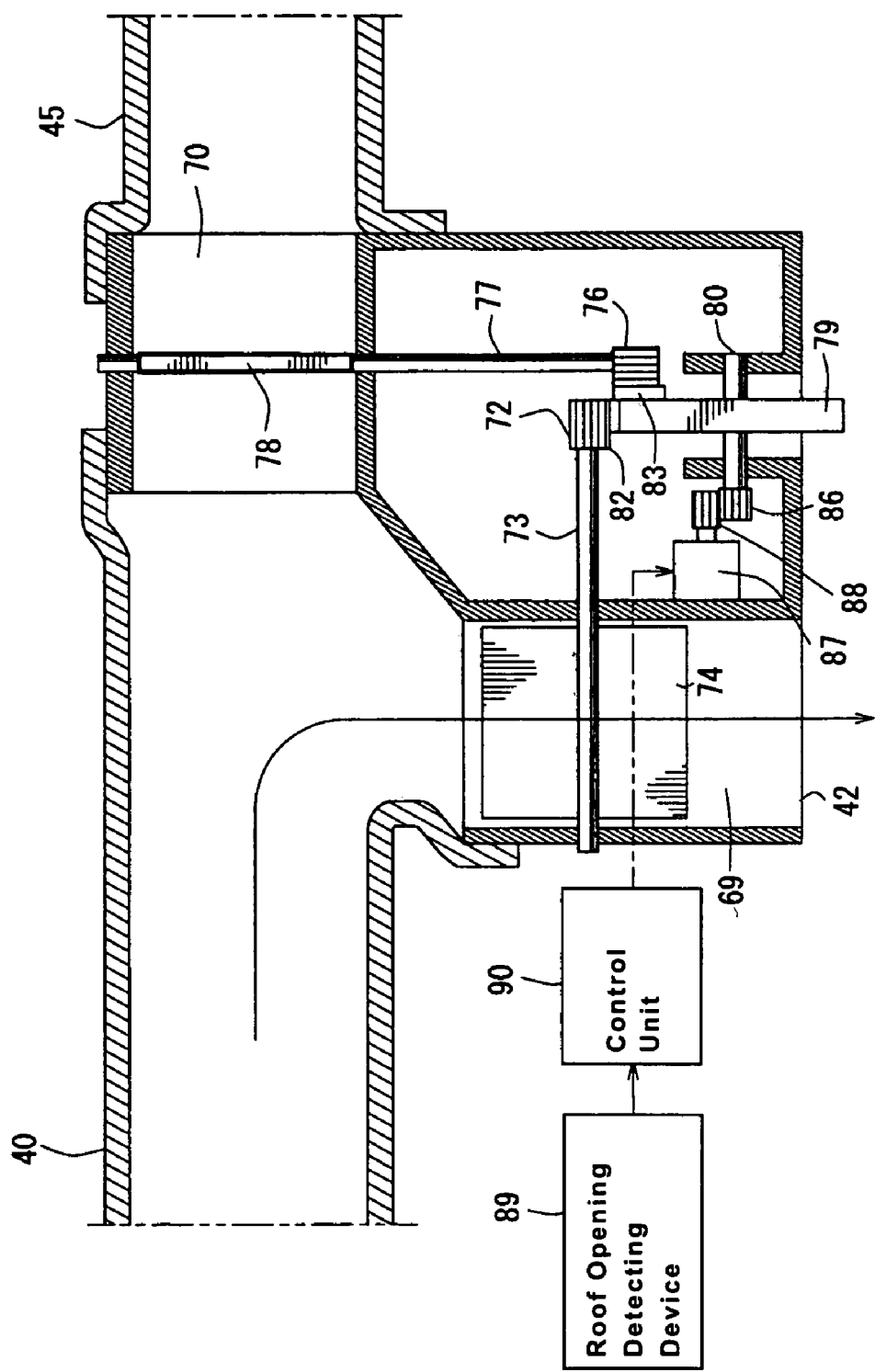
FIG. 27 is a system view showing a conditioned-air blowoff state toward the side vent blowoff port.

The operational lever 79 of the manual operational structure shown in FIGS. 18 through 20 may be configured of an electric operational structure shown in FIGS. 25 and 26 and 27. In this case, the operational lever 79 should be a switching operational portion. Namely, the operational knob 81 is omitted, while the operational lever 79 (switching operational portion) is equipped with a driven gear 86 at its support axis 80, which is driven by a drive gear 88 of the reversible motor 87 as a drive device. Also, there is provided a roof open detecting device 89 (roof open detecting device) comprised of a limit switch and a micro switch for detecting opening/closing of the roof portion 15 shown in FIG. 4. A control unit 90 (control portion) is coupled to the roof open detecting device 89 such that an output thereof drives the reversible motor 87 as the drive device in both rotational directions.

Specifically, when the roof open detecting device 89 detects the opening of the roof portion 15, the blowoff amount from the front-pillar conditioned-air blowoff port 47 is controlled so as to be greater than that from the side vent port 42 (including zero amount of blowoff from the side vent blowoff port 42) in order to improve the passenger's feeling of air conditioning effect, as shown in FIGS. 25 and 26.

More specifically, when the roof open detecting device 89 detects the opening of the roof portion 15, the blowoff amount from the front-pillar conditioned-air blowoff port 47 is controlled so as to increase more than that from the side vent port 42 in order to improve the passenger's feeling of air conditioning effect, compared with the state of the roof portion 15 closed. Namely, during the state of the roof portion 15 opened, the doors 74 and 78 are controlled as shown in FIG. 26, or controlled in the state shown in FIG. 25 such that the conditioned-air passing amount through the door 78 is greater than through the door 74. Thereby, even when the roof portion 15 is opened, the passengers can feel air conditioning effect better due to the proper amount of conditioned air from the front-pillar conditioned-air blowoff port 47.

Figure 28:
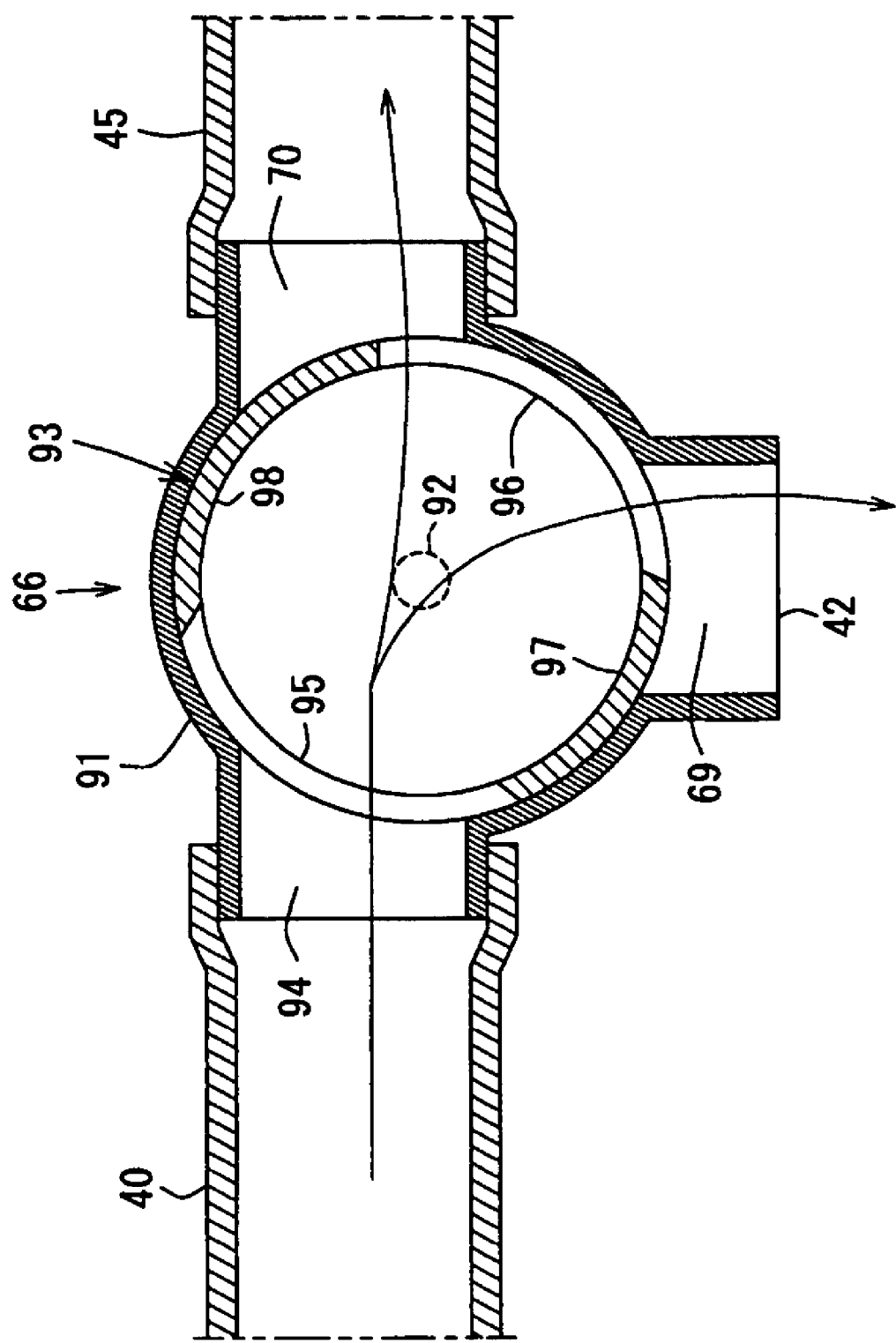
FIG. 28 is a sectional view showing further another embodiment of the switching portion.
Figure 29:
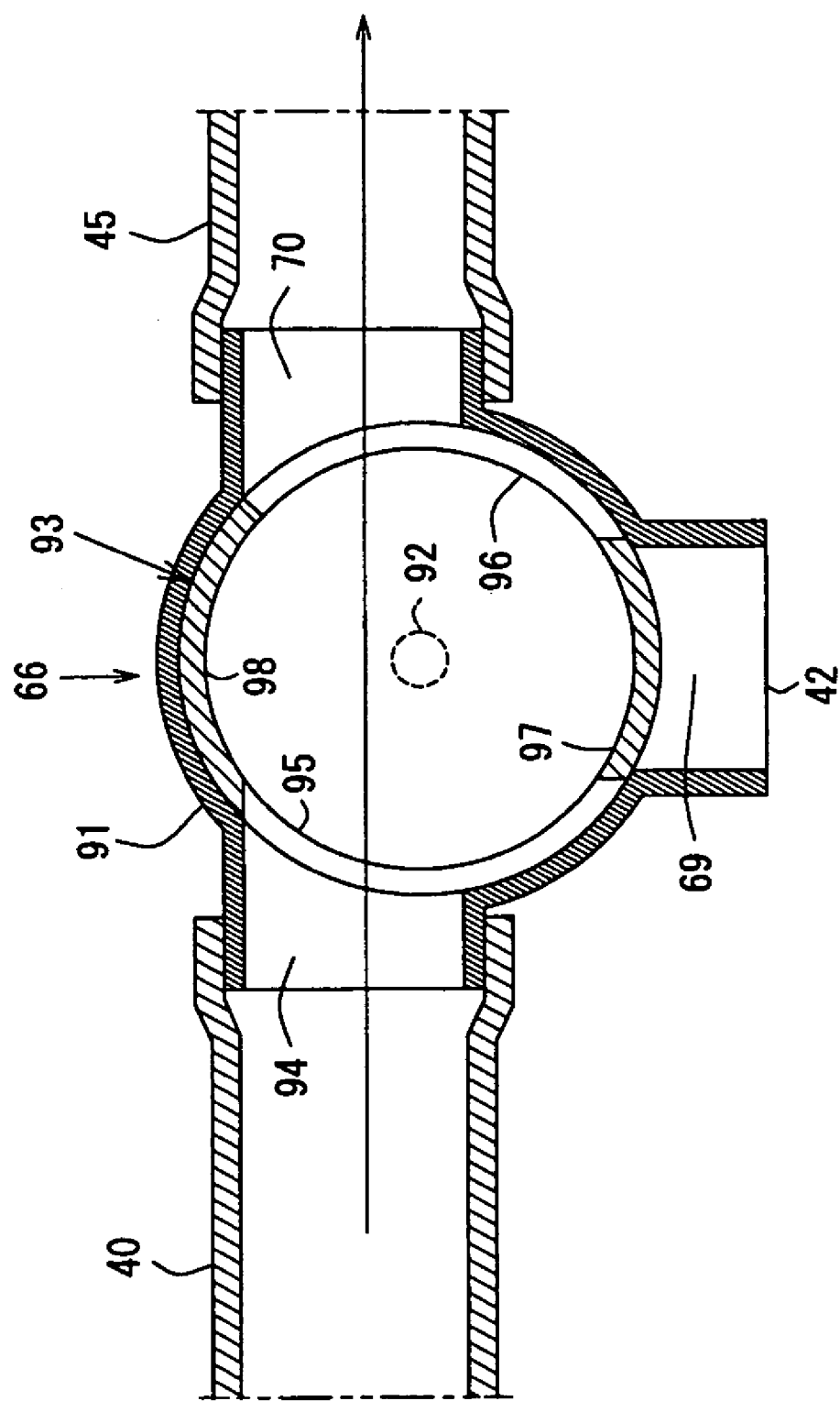
FIG. 29 is a sectional view showing a conditioned-air blowoff state toward the front pillar.
Figure 30:
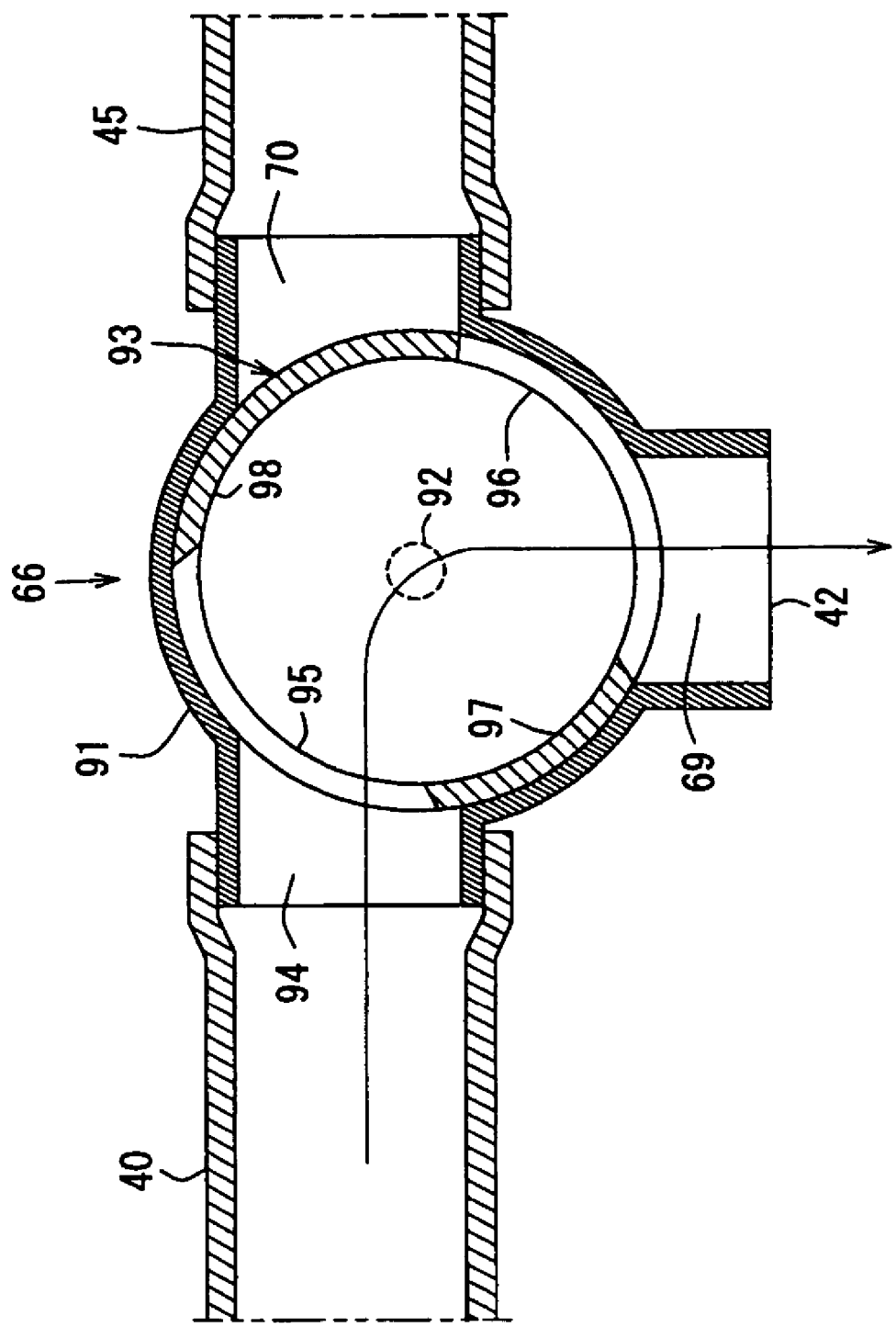
FIG. 30 is a sectional view showing a conditioned-air blowoff state toward the side vent blowoff port.

FIGS. 28, 29 and 30 show another example of the switching portion 66, in which there are provided a valve housing 91 and a rotary type of hollow valve 93 (blowoff-air adjusting device) which is disposed so as to be rotatable around a rotational center axis 92 in the housing 91. The valve housing 91 comprises a flow-in passage 94 which receives the conditioned air from the side vent duct 40, the vent passage 69 which connects with the side vent blowoff port 42, and the front-pillar side passage 70 which connects with the front-pillar conditioned-air blowoff port 47 via the branch duct 45. The valve 93 comprises an inlet port 95 and an outlet port 96, and peripheral walls 97 and 98, which also function as a shut-off wall of the conditioned air, are formed between the respective ports 95 and 96.

Herein, as shown in FIG. 28, when the inlet port 95 is let communicate with the flow-in passage 94 and the outlet port 96 is let communicate with both the vent passage 69 and the front-pillar side passage 70 at the same time, the conditioned air is supplied to and blown off from both the side vent blowoff port 42 and the front-pillar conditioned-air blowoff port 47 at the same time, as shown by an arrow in FIG. 28.

Also, as shown in FIG. 29, when the inlet port 95 is let communicate with the flow-in passage 94 and the outlet port 96 is let communicate with only the front-pillar side passage 70 with the vent passage 69 shut off by the peripheral wall 97 by the manual operation of the valve 93, the conditioned air is supplied to and blown off from only the front-pillar conditioned-air blowoff port 47, as shown by an arrow in FIG. 29.

Further, as shown in FIG. 30, when the inlet port 95 is let communicate with the flow-in passage 94 and the outlet port 96 is let communicate with only the vent passage 69 with the front-pillar side passage 70 shut off by the peripheral wall 98 by the manual operation of the valve 93, the conditioned air is supplied to and blown off from only the side vent blowoff port 42, as shown by an arrow in FIG. 30.

Herein, the valve 93 can be motor-driven by coupling the rotational center axis 92 to the reversible motor as the drive device, while the valve 93 can be manually driven by coupling the rotational center axis 92 to an operational dial (operational member) via a power transmission device such as pulley or belt.

If the switching portion 66 is configured of a rotary type as described above, reduction in parts number and simplification and compactness of the structure can be attained.

Figure 31:
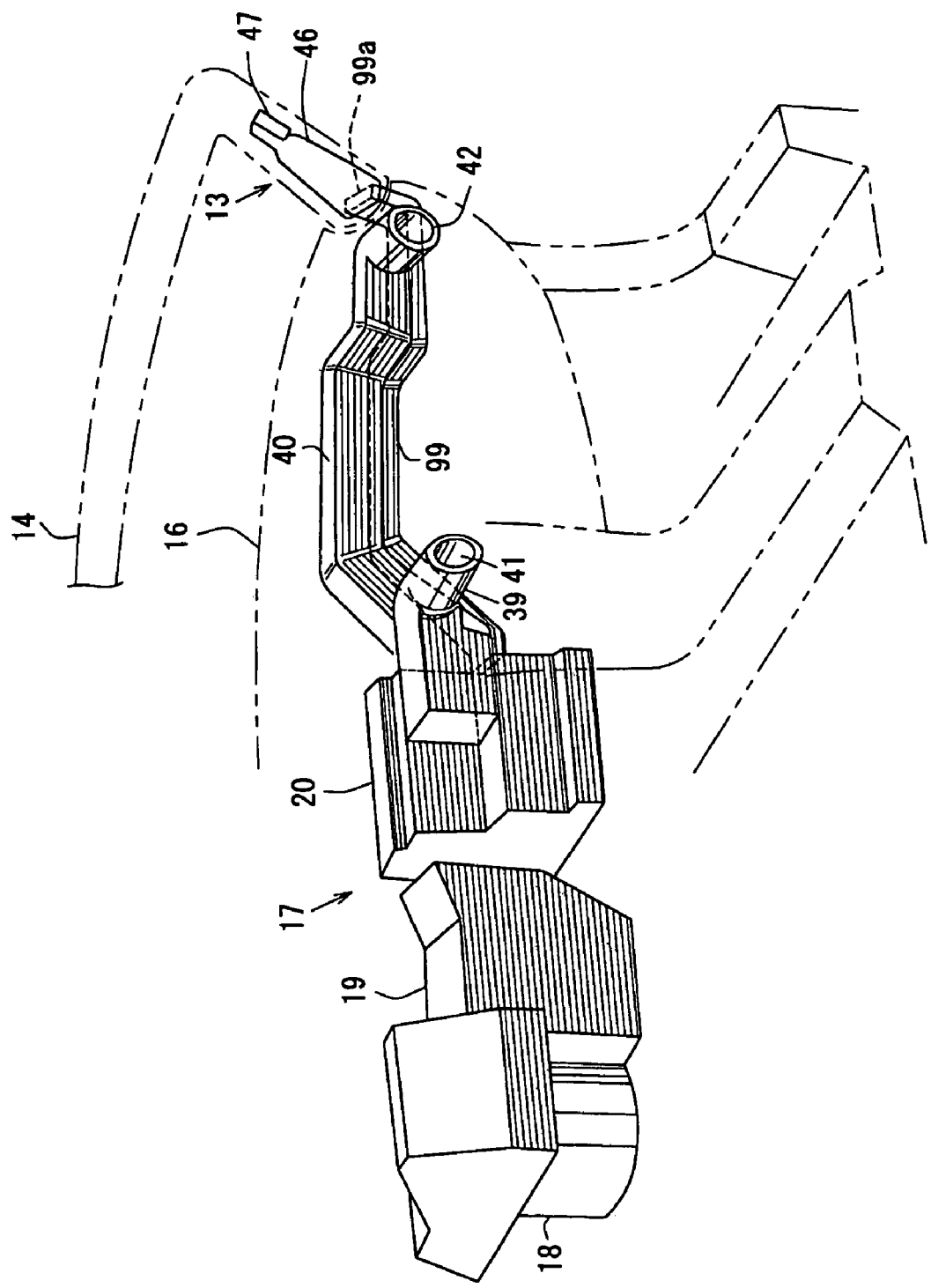
FIG. 31 is a perspective view of another embodiment of the air conditioner for a vehicle.
Figure 32:
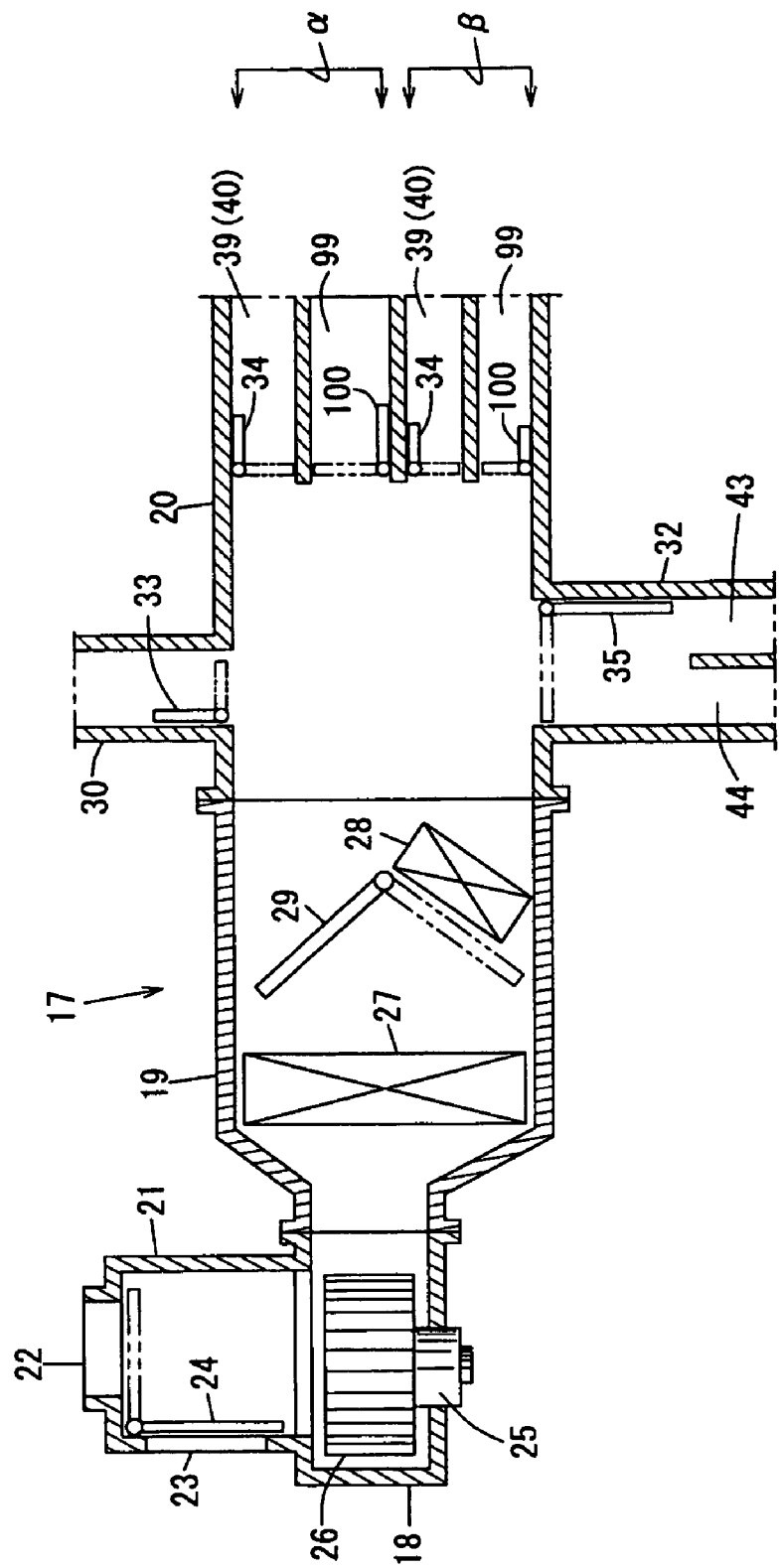
FIG. 32 is a sectional view showing an internal structure of an air conditioning unit of the air conditioner of FIG. 31.

FIGS. 31 and 32 show another embodiment of the air conditioner for a vehicle. Herein, the mode switching box 20 of the air conditioning unit 17 which is disposed in the instrument panel 16 and the vent blowoff ports 41 and 42 as the vent blowoff portion are connected by the vent ducts 39 and 40 respectively, there is provided a front-pillar side duct 99 which extends in parallel to the side vent duct 40 and is coupled to a lower portion of the front pillar duct 46 at its vehicle-outside end portion 99a, and the mode switching box 20 is connected with the front-pillar side duct 99. Namely, the side vent duct 40 and the front-pillar side duct 99 are gathered in the mode switching box 20 and the switching portion 66 is omitted. Thus, facilitation of the conditioned air switching can be attained.

Although FIG. 31 shows only driver's side of the center vent duct 39, the side vent duct 40 and the front-pillar side duct 99, these ducts 39, 40 and 99 are provided right and left symmetrically, for not only the driver's side ($\alpha$) but the passenger's side ($\beta$), as shown in FIG. 32. At respective connection portions of the mode switching box 20 with the respective ducts 39, 40 and 99 are provided doors 34 and 100 as shown in FIG. 32. In the embodiment shown in FIGS. 31 and 32, the doors 34 and 100 at the side of mode switching box 20 function as the blowoff-air adjusting device operative to adjust the blowoff amounts of the side vent blowoff port 42 and the front-pillar conditioned-air blowoff port 47. The same portions shown in FIGS. 31 and 32 as those shown in previous drawings are denoted by the same reference numerals, and descriptions of those will be omitted. In drawings, arrows F, R, IN and OUT show respectively directions to vehicle front, vehicle rear, vehicle inside and vehicle outside.

As described above, according to the present embodiment, there is provided the air conditioner for a vehicle including the front pillar 13 which is disposed diagonally in front of the passengers X, Y and Z (see FIGS. 12 and 13) and extends slant in the longitudinal direction of the vehicle, comprising the air conditioning duct (see the front pillar duct 46, the air conditioning duct 55) to be disposed along the front pillar 13, the front-pillar conditioned-air blowoff port 47 which blows off the conditioned air toward the passengers from the air conditioning duct (see the front pillar duct 46, the air conditioning duct 55), and the louver device 60 to be disposed at the front pillar 13 and deflect the conditioned air within the angle which is smaller than the slant angle of the front pillar, whereby the conditioned air from the louver device 60 can be blown off toward the neck and head portions of the passengers X, Y and Z.

Accordingly, since the conditioned air blown off from the front-pillar conditioned-air blowoff port 47 is deflected toward the passenger's neck and head portions by the louver device 60, it can provide efficiently air conditioning to the neck portion and its surroundings which are sensitive to the passenger's air conditioning feeling, improve the air conditioning function, and make the passenger X, Y, Z feel the air conditioning effect efficiently.

Further, the louver device 60 is configured so as to be adjustable within the specified angle in the vertical direction of the vehicle (see FIG. 12).

Accordingly, since the blowoff direction of the conditioned air is adjustable in the vertical direction of the vehicle by the louver device 60, it can be adjusted properly according to the body size of the passengers X, Y and Z.

Further, the louver device 60 is configured so as to be adjustable within the specified angle in the width direction of the vehicle (see FIG. 13).

Accordingly, since the blowoff direction of the conditioned air is adjustable in the width direction of the vehicle by the louver device 60, it can be adjusted properly according to the body size of the passengers X, Y and Z.

Additionally, the sitting position of the passengers X, Y and Z is configured so as to be adjustable in the longitudinal direction of the vehicle, and the louver device 60 is configured so as to be adjustable such that the conditioned air from the louver device 60 can be blown off toward the neck and head portions of the passengers X, Y and Z regardless of the sitting position of the passengers.

Accordingly, the conditioned-air blowoff can be adjusted to proper positions by the louver device 60 according to the passenger's body size even if the passenger's sitting position is changed in the longitudinal direction. Namely, the conditioned-air blowoff toward the neck and head portions can be obtained regardless of the body size of the passengers X, Y and Z.

Further, the louver device 60 is located at the relatively upper portion of the front pillar 13 from the middle.

Accordingly, since the distance between the louver device 60 and the passengers X, Y and Z becomes short, more effective air conditioning can be obtained and thereby even limited amount of conditioned air can be blown off toward the passengers certainly.

Also, the louver device 60 is configured so as to blow off the concentrated conditioned air toward the neck portion and head portions of the passengers X, Y and Z.

Accordingly, since the concentrated conditioned air is directed to desired portions, the passengers can feel the air conditioning effect more certainly.

Further, at least the roof portion 15 of the vehicle, which is located from above the passengers X, Y and Z to the front pillar 13, is configured so as to open (see FIG. 4).

Accordingly, the efficient air-conditioning control can be provided particularly for the open car with the roof portion 15 operative to open, which may have a difficulty in maintaining the proper temperature in the passenger compartment due to the outside air coming in.

Further, the air conditioner further comprises the vent blowoff port (see the side vent blowoff port 42) to blow off the conditioned air toward the passenger from the instrument panel 16 disposed at the vehicle front, and the blowoff-air adjusting device (see the operational lever 79 or the valve 93) operative to adjust the blowoff amount of the conditioned air from the vent blowoff port (see the side vent blowoff port 42) and the front-pillar conditioned-air blowoff port 47.

Accordingly, since the blowoff-air adjusting device (see the operational lever 79 or the valve 93) adjusts the blowoff amount of the conditioned air from the vent blowoff port (see the side vent blowoff port 42) and the front-pillar conditioned-air blowoff port 47, specifically the ratio of the blowoff amount of the conditioned air from between them, the proper conditioned-air amount adjustment can be attained according to needs of the passenger.

Further, at least the roof portion 15 of the vehicle, which is located from above the passengers X, Y and Z to the front pillar 13, is configured so as to open, and the blowoff-air adjusting device (see the operational lever 79 functioning as the switching operational portion) is configured so as to increase the amount of the conditioned air from the front-pillar conditioned-air blowoff port 47 more than that from the vent blowoff port (see the side vent blowoff port 42) when the roof portion opens, compared with when the roof portion is closed (see FIGS. 25 through 27).

Accordingly, since the amount of conditioned air from the front-pillar conditioned-air blowoff port 47 is increased (including no-blowoff from the vent blowoff port 42) when the roof portion 15 opens, the passenger can feel the air conditioning effect more properly even if the outside air comes in the passenger compartment 2 during the roof open driving.

Additionally, the blowoff-air adjusting device (see the operational lever 79 of FIGS. 25 through 27) is driven by the drive device (see the reversible motor 87).

Accordingly, the blowoff-air adjusting device (see the operational lever 79), which is operative to increase the amount of conditioned air from the front-pillar conditioned-air blowoff port 47 more than that from the vent blowoff port (see the side vent blowoff port 42) when the roof portion opens, can be driven automatically.

Also, the instrument panel 16 is equipped with the air conditioning unit 17, the air conditioning unit 17 (specifically, see the mode switching box 20) and the vent blowoff port (see the side vent blowoff port 42) are connected by the vent duct (see the side vent duct 40), and there is provided the front-pillar air-conditioning duct (see the branch duct 45, front pillar duct 46, air conditioning duct 55) which diverges from the vent duct (see the side vent duct 40) and is disposed along the front pillar 13 to be connected to the front-pillar conditioned-air blowoff port 47 (see FIG. 3).

Accordingly, since the front-pillar air-conditioning duct (ducts 45, 46 and 55) is configured so as to diverge from the vent duct (the side vent duct 40), the simple duct structure can be provided and thereby the duct layout in the instrument panel 16 can be improved, as shown in FIG. 3.

Further, the instrument panel 16 is equipped with the air conditioning unit 17, the air conditioning unit 17 (particularly, see the mode switching box 20) and the vent blowoff port (see the side vent blowoff port 42) are connected by the vent duct (see the side vent duct 40), and there is provided the front-pillar air-conditioning duct (see the front-pillar side duct 99, the front pillar duct 46, the air conditioning duct 55) which extends along the front pillar 13 in parallel to the vent duct (see the side vent duct 40) to be connected to the front-pillar conditioned-air blowoff port (see the front-pillar side duct 99, the front pillar duct 46, the air conditioning duct 55) (see FIG. 31).

Accordingly, no structure for switching the conditioned air at an end side of the vent duct (see the side vent duct 40) is necessary, and upstream portions (see base portions of the front pillar-side duct 99) of the vent duct (see the side vent duct 40) and the front-pillar air-conditioning duct (ducts 99, 46, 55) can be placed intensively at the mode switching box 20 at the side of the air conditioning unit 17 as shown in FIGS. 31 and 32, thereby facilitating switching of conditioned air.

Also, at least the roof portion 15 of the vehicle, which is located from above the passengers X, Y, Z to the front pillar 13, is configured so as to open, and there is provided the blowoff-air adjusting device (see the operational lever 79 or the valve 93) operative to adjust the blowoff amount of the conditioned air from the front-pillar conditioned-air blowoff port 47 according to the opening of the roof portion 15.

Accordingly, the blowoff-air adjusting device (see the operational lever 79 or the valve 93) adjusts the blowoff amount of conditioned air from the front-pillar conditioned-air blowoff port 47 such that it increases during opening of the roof portion 15. Thus, the air conditioner can provide efficiently air conditioning for the neck portion and its surroundings which are sensitive to the passenger's air conditioning feeling in the open car and improve the air conditioning function.

Also, there is provided the impact absorbing portion (see ribs 56 and 57) to absorb the impact acting from the inside of the passenger compartment at the air conditioning duct (see the front pillar duct 46, the air conditioning duct 55), and the impact absorbing portion (see ribs 56 and 57) is configured so as to absorb the impact by being deformed by the impact which is greater than the specified value.

Accordingly, since the impact absorbing portion (see ribs 56 and 57) to absorb the impact acting from the inside of the passenger compartment at the air conditioning duct (see the front pillar duct 46, the air conditioning duct 55) is provided, when the passenger's head hits the air conditioning duct during a vehicle collision, the impact absorbing portion (see ribs 56 and 57) is deformed, absorbing the impact. As a result, the security of the passenger's head during the vehicle collision can be maintained.

Also, the air conditioning duct (see the front pillar duct 46, the air conditioning duct 55) includes the cylinder portion 54 for letting the conditioned air flow therein, the cylinder portion 54 includes the rib portion 57 provided therein along the flow direction of the conditioned air, and the rib portion 57 is configured so as to be destroyed (deformed) by the impact greater than the specified value.

Accordingly, since the rib portion 57 for impact absorption is provided along the flow direction of the conditioned air, the conditioned air flowing is not prevented by the rib portion 57. As a result, both the conditioned air flowing and the impact absorption can be attained properly.

Further, the rib portion 57 comprises plural ribs, and the plural ribs are configured so as to be destroyed (deformed) respectively by the impact greater than the specified value.

Accordingly, even if the passenger's head hits the air conditioning duct (see the front pillar duct 46, the air conditioning duct 55) at the side of front pillar 13 from different directions during the vehicle collision, the plural ribs 57 can cope with this. As a result, the security of the passenger's head can be improved and the strength of the air conditioning duct during a vehicle non-collision can be maintained by these plural ribs. Herein, it may be preferred that the plural ribs 57 are disposed in different directions from each other as shown in FIG. 11.

Additionally, the air conditioning duct comprises the base portion 46b which is attached to the front pillar 13 (specifically, the front pillar inner 49) and the duct portion (see the front pillar trim 52) which is attached to the base portion 46b and exposed to the inside of the passenger compartment, and the rib portions 56, 57 are interposed between the base portion 46b and the duct portion (see the front pillar trim 52).

Accordingly, since the air conditioning duct comprises the base portion 46b and the duct portion (see the front pillar trim 52), the simple structure of the duct can be obtained and the security of the passenger's head can be maintained by the rib portions 56, 57 during the vehicle collision.

Also, the duct portion comprise the front pillar trim 52.

Accordingly, since the duct portion of the air conditioning duct 55 is comprised of the front pillar trim 52 and thus the front pillar trim 52 also functions as the duct portion of the air conditioning duct 55, both reduction of parts number and simplification of structure can be attained.

Further, the louver device 60 is configured so as to be detached from the air conditioning duct (see the front pillar duct 46, the air conditioning duct 55) by the impact greater than the specified value from the passenger compartment 2.

Accordingly, although the louver device 60, which deflects the blowoff direction of the conditioned air, makes the portion of the front pillar trim 52 hard by its provision, the louver device 60 is detached from the air conditioning duct by the impact greater than the specified value from the passenger compartment 2 when the passenger's head hits the air conditioning duct during the vehicle collision. Thus, both the deflection of the conditioned air and the security of the passenger's head during the vehicle collision can be attained.

The correspondence between constitution of the present invention and the present embodiment is as follows: the air conditioning duct corresponds to the front pillar duct 46 and the air conditioning duct 55; the front-pillar conditioned-air blowoff port corresponds to the front-pillar conditioned-air blowoff port 47; the blowoff-air adjusting device corresponds to the operational lever 79 or the valve 93; the drive device corresponds to the reversible motor 87; the vent duct corresponds to the side vent duct 40; the front-pillar air conditioning duct (claim 11) corresponds to the branch duct 45, the front pillar duct 46, and the air conditioning duct 55; the front-pillar air conditioning duct (claim 12) corresponds to the front-pillar side duct 99, the front pillar duct 46, and the air conditioning duct 55; the impact absorbing portion corresponds to the rib portions 56 and 57; and the duct portion corresponds to the front pillar trim 52.

However, the present invention should not limited to the above-described embodiments, but any other modifications and improvements may be applied within the scope of a spirit of the present invention.

What is claimed is:

1. An air conditioner for a vehicle including a pair of front pillars which are disposed diagonally in front of a passenger seated in a front seat and extends slant in a longitudinal direction of the vehicle, upper ends of the front pillars being interconnected by a front header extending in a vehicle width direction, a windshield of the vehicle being supported at the front pillars and the front header, the air conditioner comprising:

an air conditioning duct to be disposed along the front pillars;

a front-pillar conditioned-air blowoff port which blow off conditioned air toward the passenger seated in the front seat from said air conditioning duct; and a louver device to be disposed at said front pillars and deflect the conditioned air within an angle which is smaller than a slant angle of said front pillars, wherein said louver device is located at a relatively upper portion of the front pillar from the middle and configured so as to be adjustable within a specified angle in a vertical direction of the vehicle, and a conditioned-air blow-off line of the conditioned air blown off from said louver device is configured such that an upper limit thereof is approximately parallel to a belt line of the vehicle and a lower limit thereof has said angle with respect to the upper limit, whereby the conditioned air from said louver device can be blown off toward a neck portion and a head portion of the passenger, and wherein said air conditioning duct has a rib portion as an impact absorbing portion to absorb an impact acting from an inside of a passenger compartment, and said rib portion is configured so as to absorb the impact by being deformed by the impact which is greater than a specified value.

2. The air conditioner for a vehicle of claim 1, wherein said louver device is configured so as to be adjustable within a specified angle in a width direction of the vehicle, whereby the conditioned air from said louver device can be blown off toward the neck portion and the bead portion of the passenger.

3. The air conditioner for a vehicle of claim 1, wherein a sitting position of the passenger is configured so as to be adjustable in the longitudinal direction of the vehicle, and said louver device is configured so as to be adjustable such that the conditioned air from said louver device can be blown off toward the neck portion and the head portion of the passenger regardless of the sitting position of the passenger.

4. The air conditioner for a vehicle of claim 1, wherein said louver device is configured so as to blow off concentrated conditioned air toward the neck portion and the head portion of the passenger.

5. The air conditioner for a vehicle of claim 1, wherein at least a roof portion of the vehicle, which is located from above the passenger to the front pillar, is configured so as to open.

6. The air conditioner for a vehicle of claim 1, further comprising a vent blowoff port to blow off the conditioned air toward the passenger from an instrument panel disposed at a vehicle front, and a blowoff-air adjusting device operative to adjust a blowoff amount of the conditioned air from said vent blowoff port and said front-pillar conditioned-air blowoff port.

7. The air conditioner for a vehicle of claim 6, wherein at least a roof portion of the vehicle, which is located from above the passenger to the front pillar, is configured so as to open, and said blowoff-air adjusting device is configured so as to increase the amount of the conditioned air from said front-pillar conditioned-air blowoff port more than that from said vent blowoff port when said roof portion opens, compared with when said roof portion is closed.

8. The air conditioner for a vehicle of claim 7, wherein said blowoff-air adjusting device is driven by a drive device.

9. The air conditioner for a vehicle of claim 6, wherein said instrument panel is equipped with an air conditioning unit, said air conditioning unit and said vent blowoff port are connected by a vent duct, and there is provided a front-pillar air-conditioning duct which diverges from said vent duct and is disposed along the front pillar to be connected to said front-pillar conditioned-air blowoff port.

10. The air conditioner for a vehicle of claim 6, wherein said instrument panel is equipped with an air conditioning unit, said air conditioning unit and said vent blowoff port are connected by a vent duct, and there is provided a front-pillar air-conditioning duct which extends along the front pillar in parallel to said vent duct to be connected to said front-pillar conditioned-air blowoff port.

11. The air conditioner for a vehicle of claim 1, wherein at least a roof portion of the vehicle, which is located from above the passenger to the front pillar, is configured so as to open, and there is provided a blowoff-air adjusting device operative to adjust a blowoff amount of the conditioned air from said front-pillar conditioned-air blowoff port according to an opening of said roof portion.

12. The air conditioner for a vehicle of claim 1, wherein said air conditioning duct includes a cylinder portion for letting the conditioned air flow therein, an upper part of said cylinder portion has an opening portion that faces a front pillar trim that is provided at an inside face of the front pillar, said upper part of cylinder portion constitutes a part of said air conditioning duct with a part of the front pillar trim, and said rib portion is provided in said part of air conditioning duct formed between said upper part of cylinder portion and said part of front pillar trim so as to extend along a flow direction of the conditioned air.

13. The air conditioner for a vehicle of claim 12, wherein said rib portion comprises plural ribs.

14. The air conditioner for a vehicle of claim 1, wherein said louver device is configured so as to be detached from said air conditioning duct by the impact greater than the specified value.

15. The air conditioner for a vehicle of claim 1, wherein said air conditioning duct includes a cylinder portion for letting the conditioned air flow therein, and said rib portion is provided at an outside of a part of said cylinder portion so as to be located between the cylinder portion and a front pillar trim that is provided at an inside face of the front pillar.

16. The air conditioner for a vehicle of claim 15, wherein said rib portion comprises plural ribs.

* * * * *